(12) United States Patent
Nancke-Krogh

(10) Patent No.: US 10,013,137 B2
(45) Date of Patent: *Jul. 3, 2018

(54) SYSTEM AND METHOD FOR UNLIMITED MULTI-USER COMPUTER DESKTOP ENVIRONMENT

(71) Applicant: MOSAIQQ, Inc., San Francisco, CA (US)

(72) Inventor: Anders Nancke-Krogh, San Francisco, CA (US)

(73) Assignee: Datapath Limited, Derby (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,309

(22) Filed: Apr. 30, 2013

(65) Prior Publication Data

US 2013/0246936 A1 Sep. 19, 2013

Related U.S. Application Data

(63) Continuation-in-part of application No. 13/213,025, filed on Aug. 18, 2011, now Pat. No. 9,043,706.

(60) Provisional application No. 61/402,477, filed on Aug. 31, 2010, provisional application No. 61/640,550, (Continued)

(51) Int. Cl.
*G06F 3/00* (2006.01)
*G06F 3/0481* (2013.01)
*G06F 9/48* (2006.01)

(52) U.S. Cl.
CPC .......... *G06F 3/0481* (2013.01); *G06F 9/4843* (2013.01)

(58) Field of Classification Search
CPC ............ H04L 12/1822; H04L 12/1813; H04L 65/1066; G09G 5/14; G06F 3/0481; G06F 9/4843

See application file for complete search history.

(56) References Cited

U.S. PATENT DOCUMENTS

| | | |
|---|---|---|
| 6,564,246 B1 | 5/2003 | Varma et al. |
| 8,214,747 B1 | 7/2012 | Yankovich et al. |
| 8,682,973 B2 | 3/2014 | Kikin-Gil |

(Continued)

FOREIGN PATENT DOCUMENTS

DE 101 38 337 A1 11/2002

OTHER PUBLICATIONS

"WebEx Meeting Center User's Guide," 2007, 365 pages.*

(Continued)

*Primary Examiner* — Kieu Vu
*Assistant Examiner* — Asteway T Gattew
(74) *Attorney, Agent, or Firm* — Louis Wu

(57) ABSTRACT

Described herein are systems and methods for enabling an unlimited multi-user desktop environment. In accordance with an embodiment, the system includes a computing device hosting the desktop. Each user connects to the desktop through the same or different computing devices. Each user will, in their client-area, render a section of the unlimited sized multi-user desktop. The section can be the same or different for all users. In accordance with an embodiment, compatible objects can be allowed to render the same content at different content positions for each connected user. For example, a user can scroll on a shared webpage without impacting the scroll position for other users looking at the same window of the same webpage. Additional embodiments are also described herein.

19 Claims, 17 Drawing Sheets

Related U.S. Application Data filed on Apr. 30, 2012, provisional application No. 61/790,895, filed on Mar. 15, 2013.

(56) References Cited

U.S. PATENT DOCUMENTS

| | | | |
|---|---|---|---|
| 2002/0033839 A1 | 3/2002 | Elber | |
| 2005/0080915 A1 | 4/2005 | Shoemaker et al. | |
| 2005/0086612 A1* | 4/2005 | Gettman | G06F 3/04815 715/848 |
| 2005/0132299 A1* | 6/2005 | Jones et al. | 715/759 |
| 2007/0294632 A1* | 12/2007 | Toyama et al. | 715/764 |
| 2009/0096810 A1 | 4/2009 | Green | |
| 2009/0204912 A1* | 8/2009 | Lovering | G06F 3/0481 715/762 |
| 2010/0261507 A1 | 10/2010 | Chang | |
| 2010/0268694 A1 | 10/2010 | Denoue et al. | |
| 2011/0202834 A1* | 8/2011 | Mandryk | G06F 3/04883 715/701 |
| 2012/0047449 A1 | 2/2012 | Burckart et al. | |
| 2012/0054640 A1 | 3/2012 | Nancke-Krogh | |
| 2012/0303452 A1 | 11/2012 | Xue et al. | |
| 2014/0333674 A1* | 11/2014 | Lawson | G06F 3/0481 345/684 |

OTHER PUBLICATIONS

International Searching Authority, International Search Report and Written Opinion for PCT/US2013/038916, dated Oct. 29, 2013, 15 pages.

\* cited by examiner

SYSTEM AND METHOD FOR UNLIMITED MULTI-USER COMPUTER DESKTOP ENVIRONMENT

CLAIM OF PRIORITY

This application is a continuation-in-part of U.S. patent application titled "SYSTEM AND METHOD FOR ENABLING A COLLABORATIVE DESKTOP ENVIRONMENT", application Ser. No. 13/213,025, filed Aug. 18, 2011, and published as U.S. Publication No. 20120054640, which claims the benefit of priority to U.S. Provisional Patent Application titled "SYSTEM AND MACHINE FOR A COLLABORATIVE REMOTE DESKTOP ENVIRONMENT," Application No. 61/402,477, filed Aug. 31, 2010; and claims the benefit of priority to U.S. Provisional Patent Application titled "SYSTEM AND METHOD FOR UNLIMITED MULTI-USER COMPUTER DESKTOP ENVIRONMENT", Application No. 61/640,550, filed Apr. 30, 2012, and U.S. Provisional Patent Application titled "SYSTEM AND METHOD FOR UNLIMITED MULTI-USER COMPUTER DESKTOP ENVIRONMENT", Application No. 61/790,895, filed Mar. 15, 2013; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems, and user-computer interaction, and are particularly related to systems and methods for enabling an unlimited multi-user computer desktop.

BACKGROUND

A traditional computer is equipped with a desktop confined to the size of the monitors attached to the computer. The computer desktop is organized in layers of objects—typically referred to as windows, applications or widgets. The lowest layer of the desktop contains a background image, and on top of that icons or shortcuts used to start applications that will render themselves as layered windows.

Such layering of objects is a natural way to extend the use of the computer to do more than one thing at a time, and to quickly jump between tasks. However it only works well when the number of objects is fairly small. Once a larger number of objects are running, then the task of finding the object becomes quite complicated, since the user has to shuffle through the stack of objects.

Previous approaches have tried to simplify the search for an object of interest by providing, e.g., a preview of the object when the user hovers their mouse over the object icon, or when the number of active objects are presented in preview thumbnails on a task-list. However, the growing number of tasks solved with computers call for an ever-growing number of objects, and thus a better way to arrange objects on a desktop is needed.

SUMMARY

Described herein are systems and methods for enabling an unlimited multi-user desktop environment. In accordance with an embodiment, the system includes a computing device hosting the desktop. Each user connects to the desktop through the same or different computing devices. Each user will, in their client-area, render a section of the unlimited sized multi-user desktop. The section can be the same or different for all users. In accordance with an embodiment, compatible objects can be allowed to render the same content at different content positions for each connected user. For example, a user can scroll on a shared webpage without impacting the scroll position for other users looking at the same window of the same webpage. Additional embodiments are also described herein.

In accordance with an embodiment, the system can support notification and permission features to handle conflicts when multiple users, e.g., try to change the state of an object. Embodiments can take active users into account, using notification and conflict management, so that suitable notification and handling is performed if a first user, e.g., attempts to move an object that is actively used by another user—since the desktop is shared, a movement of the object made by one user applies to all users. In accordance with an embodiment, this will typically include visual feedback to guide the users of which objects are actively used by other users. The purpose is to prevent changes to objects made by one user while the object is being used by one or more other users.

In accordance with an embodiment, the system will allow compatible objects to start new object instances from the same state as an existing object, in the event a user wants to perform a state changing action on an object that is actively used by other users. This method prevents disruption of the other users of the unlimited multi-user desktop.

In accordance with an embodiment, the system can include features for determining an application state, or instantiating a new application instance with a substantially same state, as described in U.S. patent application titled "SYSTEM AND METHOD FOR ENABLING A COLLABORATIVE DESKTOP ENVIRONMENT", application Ser. No. 13/213,025, filed Aug. 18, 2011, and published as U.S. Publication No. 20120054640; which application is herein incorporated by reference.

In accordance with an embodiment, the system will allow any user to place any object at any location on an unlimited sized desktop. Border control of the movement can be used to prevent a user from accidentally moving the object so far away that the object becomes difficult to locate again.

DETAILED DESCRIPTION

Figure 1:
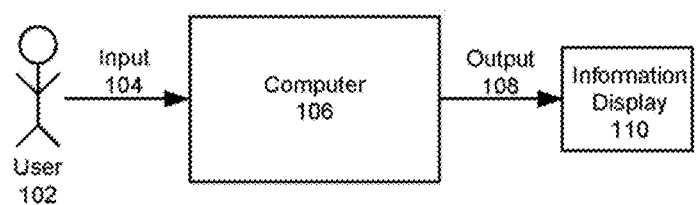
FIG. 1 shows an illustration of a high-level view of a typical computing domain or environment, in accordance with an embodiment.

Described herein are systems and methods for enabling an unlimited multi-user desktop graphical user interface for computing devices. As described above, a traditional computer is equipped with a desktop confined to the size of the monitors attached to the computer. The computer desktop is organized in layers of objects—typically referred to as windows, applications or widgets. The lowest layer of the desktop contains a background image, and on top of that icons or shortcuts used to start applications that will render themselves as layered windows. Such layering of objects is a natural way to extend the use of the computer to do more than one thing at a time, and to quickly jump between tasks. However it only works well when the number of objects is fairly small. Once a larger number of objects are running, then the task of finding the object becomes quite complicated, since the user has to shuffle through the stack of objects.

In accordance with an embodiment, an unlimited multi-user desktop where all objects are visible and the user can freely navigate the entire desktop helps solve this problem. The solution is based on the physical world, where users sit around an enormous table with papers all over it. A first user can choose to sit anywhere along the sides of the table, and read/write on any of the papers within reach of that chair. Simultaneously a second user can sit on any other chair around the table and work with other papers. Applying the same concept on the computer desktop provides several additional advantages that the physical world does not allow. Several users can be sitting in the same "chair" at the same time, reading or writing the same object. When a larger surface is needed to hold new/more objects, then a computer based system will simply extend the available size as needed.

Glossary

In accordance with an embodiment, the following terms are used herein. In accordance with other embodiments, different and/or other terms can be used:

An "information display" refers to the visual output of a computer that can be controlled by one or more persons or users, and is sometimes referred to as the "desktop" of the computer. In accordance with an embodiment, the information display can be rendered over one or more physical display devices. In accordance with other embodiments, the information display can be provided such that it covers only a portion of a display device—sometimes referred to as a "split-screen" system.

A "computer" refers to an electronic or computing device that takes input from one user and renders the derived output to an information display. A computer can be implemented as physical hardware or virtual hardware in a physical hardware computing device.

A "computing device" refers to a physical mobile or stationary machine that hosts one or more computers.

A "display device" refers to a physical display that renders the output from one computing device.

A "remote desktop" refers to a system where the information display of a user's computer is rendered in a window on a plurality of other users' information displays.

A "window" refers to a visible output of an application as rendered on an information display. Depending of the capability of the computer used, several windows can be displayed simultaneously on the information display, and the windows can be layered, moved and resized.

An "application" refers to a software program that is previously installed and now executed by a computer. The computer controls which inputs from the user are directed to the application, and the computer controls which outputs the application is allowed to render on the display device. Depending of the capability of the computer, one or several applications can be installed simultaneously and/or running simultaneously.

An "application state" comprises one or more of the application, the content file(s) the application is using and/or writing, and/or all inputs made by the user of this application since the user started using the application for a particular launch of the application (e.g., all input from the opening of the application). In accordance with an embodiment, the application state provided by a first application instance must be adequate and detailed enough to enable another computer or application instance to reach the same (target) application state, or an application state as close as possible or substantially identical, synchronized, or otherwise similar to the target application state.

In accordance with an embodiment, an "msync", sometimes referred to as an "online-media-sync" is the process by which the system enables an application or user to copy the state of an application session (could be a browser) associated with another application or user, so that the user can thereafter continue within their own copy of the application session, starting from a substantially identical, synchronized or otherwise similar position and state, without interrupting the other user.

A "controlling user of an object" refers to the specific user that currently has the right to move/resize/layer and change state of the specific object. Each object can only have one controlling user at any given point in time. An object may not have any controlling user, meaning that any user who wants to take control can get it.

"Active users of an object" refers to the list of multiple users that is actively using the specific object. Each object can have none or one or multiple users actively using the object simultaneously.

A "desktop" refers to the placement, size and layer of a collection of objects over a defined area. The information is stored within the computing device defined as the host of the desktop.

A "multi-user desktop" refer to a desktop that allow the ability of a plurality of users to view the same or unique locations and/or unique zoom of the area defined as the desktop. The objects position, size and z-layer are shared between all users. The content position within an object can be unique for each user if supported by the object.

An "unlimited desktop" refer to a desktop where the position of objects and the area they occupy has no limits. This means, for example, that the distance between two objects can be approaching indefinite. The physical display or collection of displays through which a user is viewing the desktop has physical limits in size. The user can choose which section of the desktop to have in view and at what zoom ratio.

A "controlled movement" refers to the movement of an object made under direct control of user input. An example is when a user is moving an object with a mouse or with touch.

An "animated movement" refers to the movement of an object made by a physics engine. This movement is the result of previously controlled movement by a user followed by the user letting go of the control.

A "client-area" refers to the size and proportion of the monitor or division of a monitor that a user (client) uses to render a section of the desktop.

An "object" refers to a graphical element rendered by a computing device. The element occupies a certain area than can be but is not restricted to a rectangular shape. The object has a position. An object can contain state and methods for how rendered output and state is a function of input over time. An object can have state changes that are local in nature and state changes that impact the entire object. For example, if the object is a browser the state describing the content position of the page is local in nature where the state describing the loaded URL impacts the entire object. An object can be but is not limited to a window, widget or application e.g., for handling documents, spreadsheets, presentations, web-browser and PDF files.

Introduction

FIG. 1 shows an illustration of a high-level view of a typical computing domain or environment, in accordance with an embodiment. As shown in FIG. 1, the system includes a user 102, a computer 106, and an information display or desktop (e.g., a computer monitor) 110. The user can interact with the computer by providing input 104 to the computer. The various types of input methods that can be used include, but are not limited to, mouse input (e.g., left, right, double clicks using the mouse), touch input (e.g., touch and dragging with one or more fingers at a monitor or touchpad), and keyboard input. The computer receives the input and makes calculations to produce an output 108 (e.g., a visual output, such as a desktop display) based on the input received at the computer and the currently running applications, along with the current state and current files used and/or controlled by the applications. The visual output can be a visual representation that is displayed on the information display.

Figure 2:
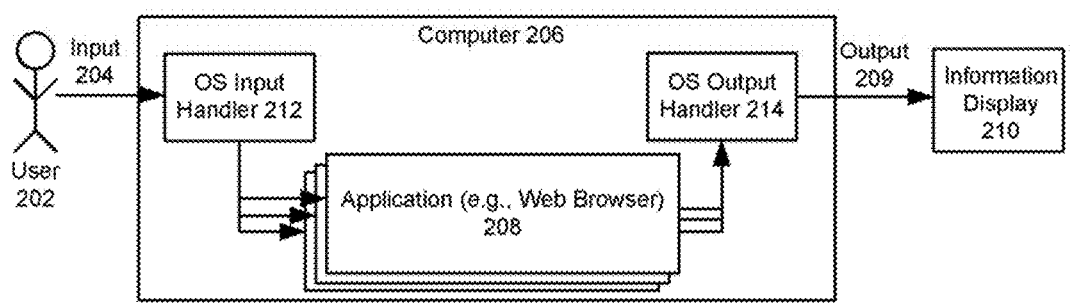
FIG. 2 illustrates a more-detailed view of the computing domain or environment in FIG. 1, including an application and operating system, in accordance with an embodiment.

FIG. 2 illustrates a more-detailed view of the computing domain or environment in FIG. 1, including an application and operating system, in accordance with an embodiment. As shown in FIG. 2, the system includes a user 202, a computer 206, and an information display 210. The computer includes an Operating System (OS) input handler 212, OS output handler 214, and one or more applications. The OS input handler receives input 204 from the user, and forwards that input to an application 208 for further processing. The OS output handler receives the requested visual output from each of the currently running applications on the computer, and determines the portion of the visual output received from each of the applications that will be rendered on the information display. The OS output handler outputs the visual output 209 to the information display. In the event there is more than one visual output from the applications being partly on top of each other, a partial rendering of those visual outputs can be displayed.

Figure 3:
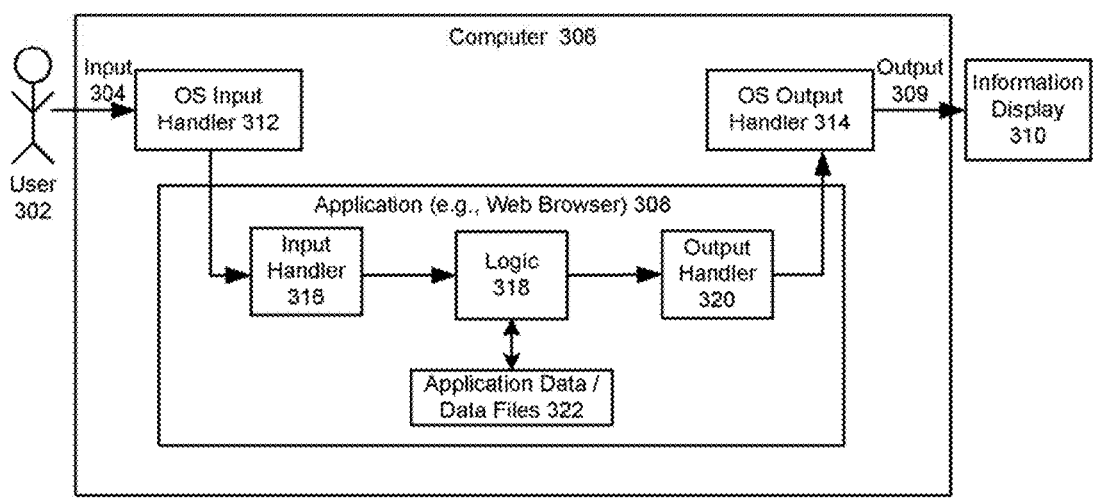
FIG. 3 illustrates a more-detailed view of the computing domain or environment in FIG. 2, including an application input handler, application logic, application output handler, and application data in accordance with an embodiment.

FIG. 3 illustrates a more-detailed view of the computing domain or environment in FIG. 2, including an application input handler, application logic, application output handler, and application data in accordance with an embodiment. As shown in FIG. 3, the system includes a user 302, a computer 306, and an information display 310. An application 308 running on the computer includes an application input handler 316, application logic 318, application output handler 320, and application data/data files 322. Input 304 is received by the application input handler from an OS input handler 312. The application input handler communicates the input to the application logic component, which upon processing the input updates the application state, and the application data/data files used by the application.

In accordance with an embodiment, described in further detail below, the application state must be adequate and detailed enough to enable another computer or application instance to reach the same (target) application state, or an application state as close as possible or substantially identical, synchronized, or otherwise similar to the target application state. To this end, in accordance with an embodiment, the application state can include an application start condition, a data file start condition, and the sequence and timing of all inputs received by the OS input handler. The application converts the current state to a visual output to be displayed on an information display. An OS output handler 314 receives the converted current state from the application output handler, and decides how much of the visual output will be displayed on the information display, where on the information display the visual output will be located, and outputs 309 the visual output to the information display.

Figure 4:
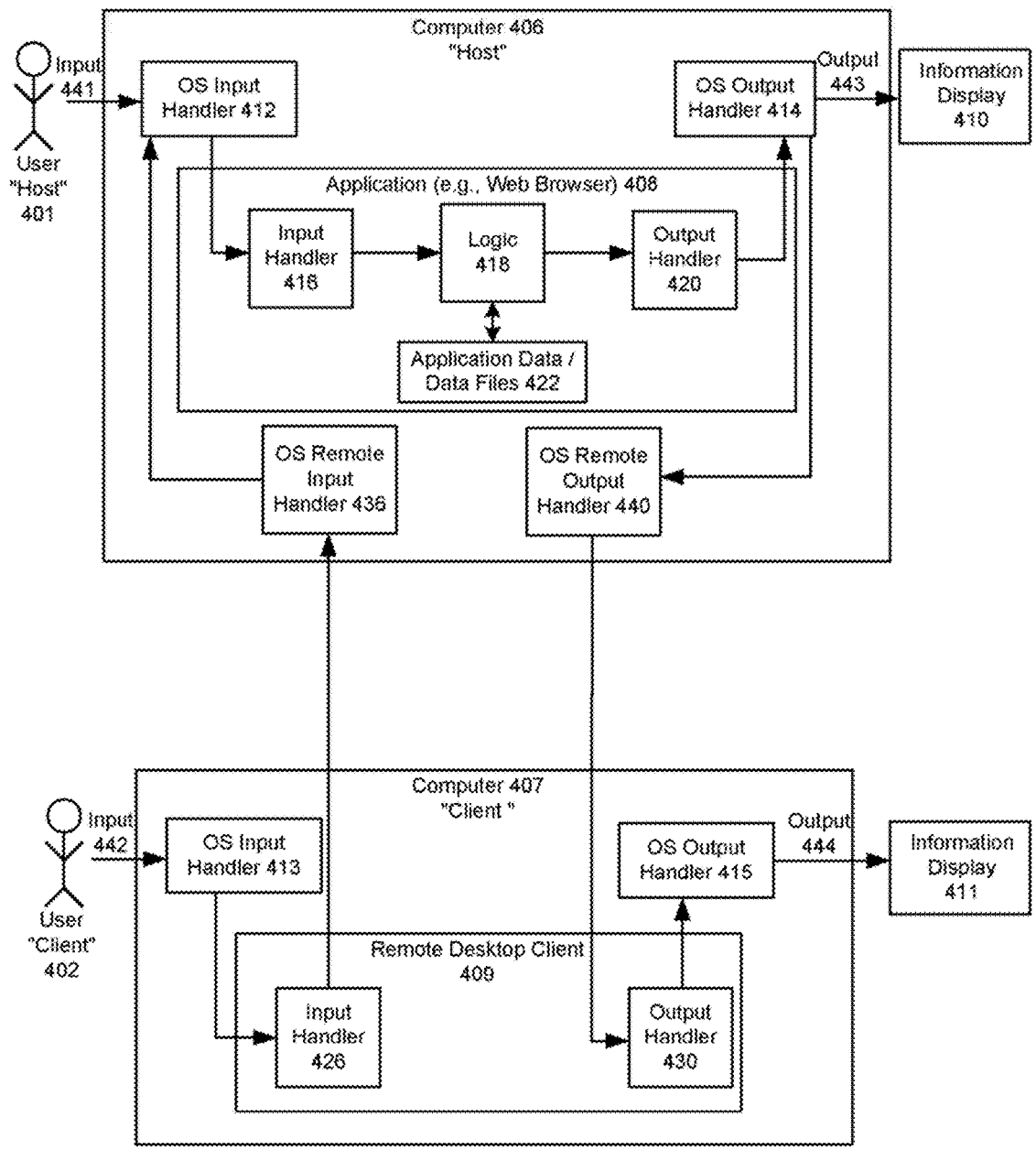
FIG. 4 shows an illustration of how a computing domain or environment can be used to enable a remote desktop system, in accordance with an embodiment.

FIG. 4 shows an illustration of how a computing domain or environment can be used to enable a remote desktop system, in accordance with an embodiment. As shown in FIG. 4, in a "classical" remote desktop environment, a host user 401 can interact with a client user 402 about, e.g., content discovery. The host user can initiate the discovery by starting a first application 408 (e.g., a host application) at a first device 406 (e.g., a host computer). The host application can be, for example, a web browser or another application. The host user can interact with the host application by providing input 441 to the computer. As described above, the various types of input methods that can be used include, but are not limited to, mouse input (e.g., left, right, double clicks using the mouse), touch input (e.g., touch and dragging with one or more fingers at a monitor or touchpad), and keyboard input. The client user creates a remote desktop connection using a remote desktop client application 409 at the client user's computer 407. The host computer initializes an OS remote input handler 436 and an OS remote output handler 440. The OS remote input handler receives input (e.g., a request to interact with the host application) from an input handler 426 at the remote desktop client application, where the input can be from the client user. When the client user interacts with the remote desktop client application, a command to interact 442 (i.e., an interaction command) is received at, then communicated from an OS client input handler 413 to the input handler at the remote desktop client application. The input handler communicates the interaction command to the OS remote input handler on the host computer, which in turn communicates the interaction command to an OS host input handler 412.

The interaction command is treated as though it were sent by the host user. For example, once the interaction command is received by the host application at an input handler 416, the application responds according to the interaction command, not knowing if the input originated from the host or client user. The input handler at the host application communicates the interaction command to an application logic component 418, where the host computer uses data in the application logic component and application data/data files 422 to create a visual output to be displayed on an information display 410 (e.g., a host information display). For example, an OS output handler 414 can receive the visual output from an application output handler 420, and decide how much of the entire window will be displayed and where on the information display the window will be located before outputting 443 the visual output to the information display.

In accordance with an embodiment, the OS output handler communicates the visual display to the OS remote output handler, which in turn communicates the visual output to an output handler 430 at the remote desktop client application. The output handler communicates the visual output to an OS output handler 415 to be communicated 444 to an information display 411 (e.g., client information display). In accordance with an embodiment, the information display renders a window showing a current (e.g., live) representation of the information display of the host user's computer. Inputs received at the host application result in a direct update of the host application and the host user's information display. These updates are communicated from the OS remote output handler to the remote desktop output handler at the remote desktop application, and the client user's information display is updated in real time with the same visual representation as displayed at the host user's information display. The host information display and the client information user display are updated based on the interaction command. For example, the host application is displayed as a window within the host information display, and the viewable area of the host information display is displayed within a window on the client information display.

Figure 5:
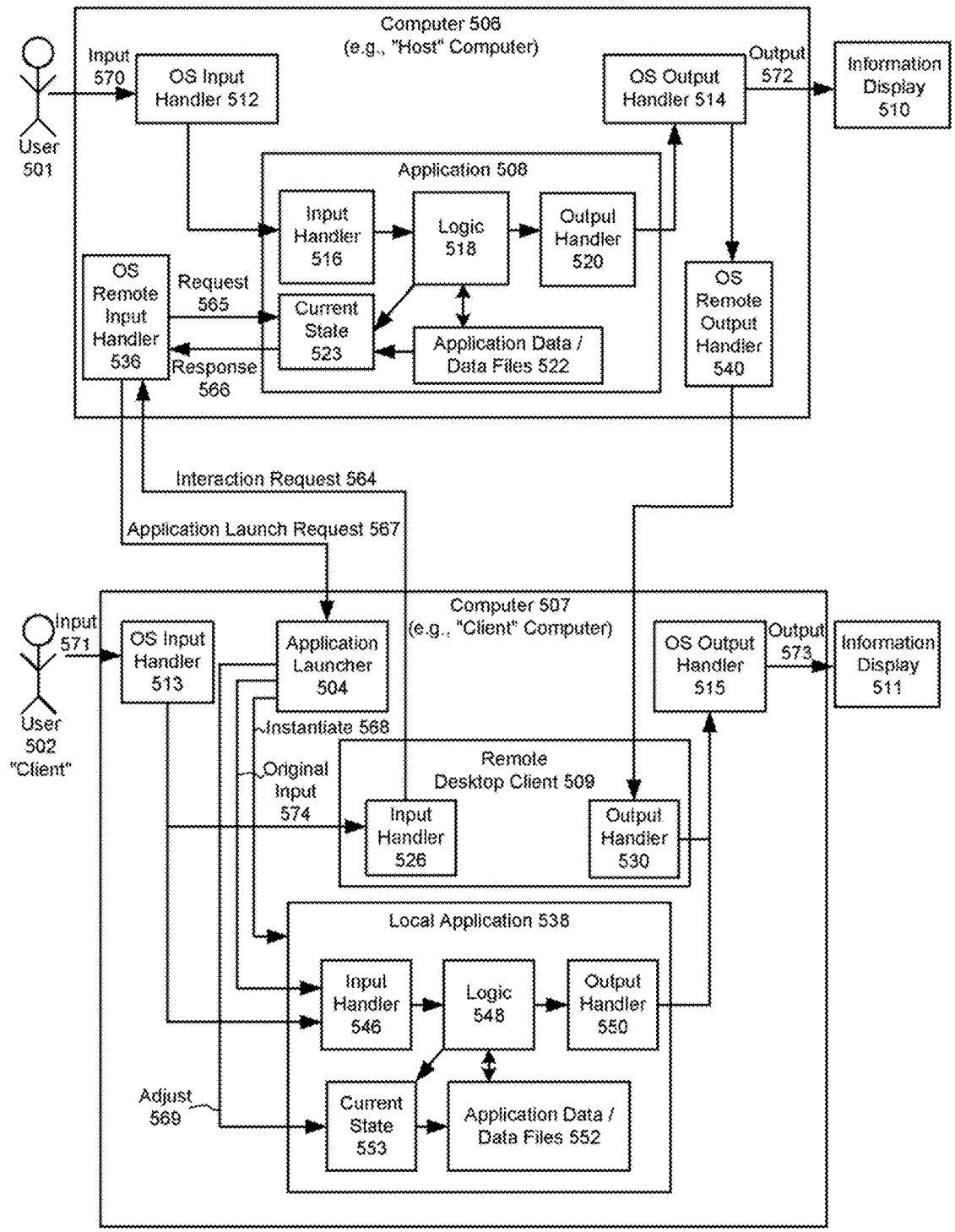
FIG. 5 illustrates how a computing domain or environment, such as that shown in FIG. 4, can instead utilize an application's current state, to enable a collaborative desktop environment, in accordance with an embodiment.

FIG. 5 illustrates how a computing domain or environment, such as that shown in FIG. 4, can instead utilize an application's current state, to enable a collaborative desktop environment, in accordance with an embodiment. As shown in FIG. 5, interactions made by a user (e.g., a client user) through a remote desktop window on an application (e.g., a host application) can result in the host application being opened on the client user's computer. In accordance with an embodiment, the client user can have two applications running, a remote desktop window where the client user follows another user's (e.g., a host user) activities, and a new instance of the host application running locally on the client user's computer, but in a different state. User activity on the local application made by the client user only effects the local application. Activity made by the host user on the host application will result in a change on the host applications, and an updated information display in the client's remote desktop windows.

Although in the example shown in FIG. 5, a host computer having a host application is described, wherein the host application is accessed by a client user, in accordance with other embodiments, the system can reside on a single shared computing device. For example, the shared computing device can have a first application instance, wherein the user activity made by a first user at the shared computing device instantiates a second application on the shared computing device having a state substantially identical to that of the first application, for use by a second user. Additionally, as described above, the labels "host" and "client" are used herein to differentiate two instances of an application (or device), but these labels can be interchanged.

As shown in FIG. 5, a user 502 (e.g., a client user) can interact with a remote desktop application 509 at a computer 507 (e.g., a client computer). The client user can, e.g., interact with an application 508 (e.g., host application) at a computer 506 (e.g., host computer). Although in this example a host user and client user are described, any plurality of users can collaborate. In accordance with an embodiment, the host computer includes an application having an input handler 516, a logic component 518, an output handler 520 and application data/data files 522. An interaction input/request 570 from a user 501 (e.g., host user) is received by the application input handler from an OS input handler 512. The application input handler communicates the input (i.e., interaction input/request) to the application logic component which updates the application state and updates the application data/data files used by the application. The host application converts the current state to a visual output to be displayed on an information display 510. For example, an OS output handler 514 receives the visual output from the application output handler. The OS output handler decides how much of the entire window will be displayed, where on the information display the window will be located, and communicates the visual output 572 to the information display. The OS output handler also communicates the visual output to an OS remote output handler 540, which in turn communicates the visual output to an output handler 530 at the remote desktop client application for display at an information display 511 (e.g., a client information display).

In accordance with an embodiment, the remote desktop client application includes an input handler 526 and an output handler. The input handler at the remote desktop communicates 564 the interaction request to an OS remote input handler 536, which requests 565 a complete record of the host application's current state from a current state component 523 at the host application. In accordance with an embodiment, the current state component collects application data/data files, which can include metadata describing how to start the host application on the client user's computer, and metadata to instantiate a local instance of the host application on the client computer having the same state as the host application. For example, the application data/data files can include instructions describing how to download and install the host application, the application settings such as menus and options that are enabled on the host application, the privacy setting (e.g., shared or private) of the file(s) controlled by the host application, the location (e.g., a URL or network sharing information) for the file(s) controlled by the host application, the current configuration information of the host application, such as scroll location of all scrollable and configurable sections of the host application, application session information such as cookie files (e.g., when the host application is a web browser), and information about actionable sections of the host application such as a URL behind a link on the host application. Alternatively, if a cloud-based system is used to maintain the application data/data files, the current state component can refer to a link to the location of the application data/data files in the cloud-based system. The current state information, local files, and if applicable, the link to the cloud-based system having the application data/data files are returned 566 to the OS remote input handler.

In accordance with an embodiment, the OS remote input handler at the host computer communicates an application launch request 567 to an application launcher 504. The application launcher receives the application data/data files, in addition to the application/launch information. In accordance with an embodiment, if the host application is not installed on client user's computer, the application launcher initiates a download and install of a compatible host application for the client user's computer. If the host application is a "premium application" (e.g., an application that requires some form of payment), then the application launcher requests payment for the application. Once installed, the application launcher instantiates 568 an instance of the host application as local application 538 on the client computer.

The local application includes an input handler 546, application logic 548, an output handler 550, a current state component 553 and application data/data files 552. Once the local application is started, application launcher communicates 569 the application data/data files to the current state component, and adjusts the local application's current state to the same state as the host application's state using the current state information (i.e., the application data/data files) of the host application. For example, the local application data/data files will be updated and all internal state variables will be set to replicate the host applications state variables, including link to cloud-based files if applicable. The cursor and application position and size can also be set to the same position as in the host application.

In accordance with an embodiment, the application launcher communicates 574 the original interaction input/request made by the client user on the remote desktop application to the input handler of the local application. For example, an input 571 received at an OS input handler 513 is communicated to the input handler 546 on the local application. The local application converts the current state to a visual output to be displayed on the information display. An OS output handler 515 receives the visual output from the output handler at the local application. The OS output handler decides how much of the entire window will be displayed, where on an information display the window will be located, and communicates the visual output 573 to the information display.

Figure 6:
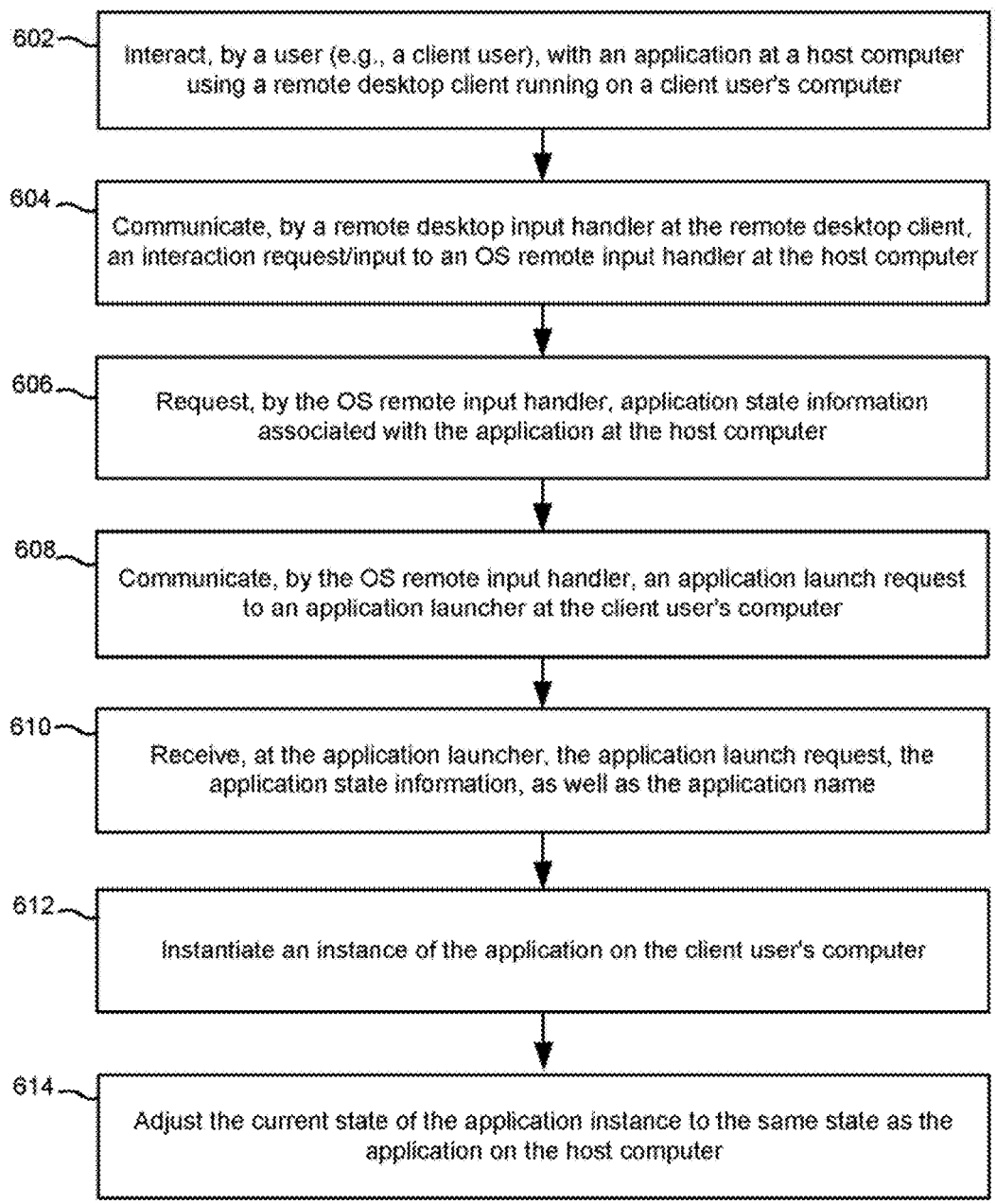
FIG. 6 shows a flow chart of a method in accordance with an embodiment, for providing a collaborative remote desktop system.

FIG. 6 shows a flow chart of a method in accordance with an embodiment, for providing two-way collaboration in a collaborative desktop system. As shown in FIG. 6, at step 602, a user (e.g., a client user) interacts with an application (e.g., a host application). The client user can interact with the host application using a remote desktop client application. The interaction can include, e.g., selecting a web link on the host application. At step 604, a remote desktop input handler at a host computer forwards an interaction request to an OS remote input handler on the host computer. Although in this example a host user and client user are described, any plurality of users can collaborate.

At step 606, upon receiving the interaction request, the OS remote input handler obtains a complete record of the host application's current state from a current state component. In accordance with an embodiment, the current state component collects host application data/data files, such as current application state information. In accordance with an embodiment, the application data/data files can include metadata describing how to start the host application on the client user's computer, and metadata to instantiate a local instance of the host application on the client computer having the same state as the host application. At step 608, the OS remote input handler communicates an application launch request to an application launcher at the client computer. The current state information, local files, and if applicable, a link to the cloud-based system having the current application state files are used to launch an instance of the host application on the client user's computer. At step 610, the application launcher receives the application launch request, the application state information, in addition to the host application installation/launch information, to launch an instance of the host application on the client user's computer.

In accordance with an embodiment, the application launcher determines whether the host application is installed on the client user's computer. If the host application is not installed on the client's computer, then an instance of the host application is installed on the client user's computer. If the host application is a premium application (e.g., an application that requires payment), then the application launcher requests payment. At step 612, an instance of the host application is installed and instantiated on the client computer. At step 614, upon installing and instantiating the application instance, the application launcher adjusts the application instances current state to the same state as the host application's state. Once the state is set for the application instance, the application launcher communicates the original interaction request made by the client user to the input handler of the application instance. The application instance then operates independent from the application at the host computer which it was instantiated from.

Figure 7:
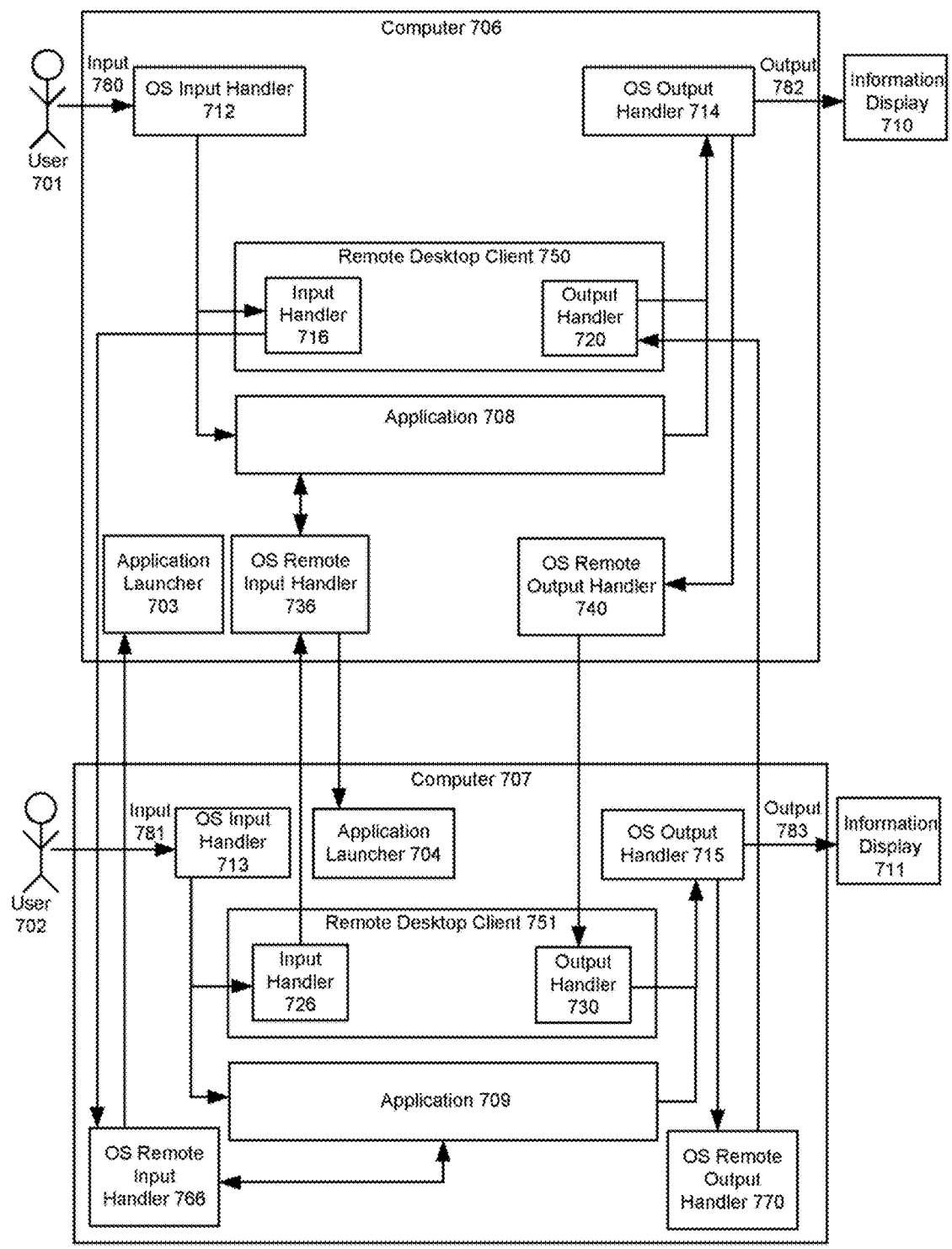
FIG. 7 shows an illustration of an exemplary system for two-way collaboration, in accordance with an embodiment.

FIG. 7 shows an illustration of an exemplary system for two-way collaboration, in accordance with an embodiment. Although in the example shown in FIG. 7, a first user and a second user are described, any plurality of users can collaborate. Additionally, although the users will be referred to as a first user and a second user, either user can be an active user or a passive user. In accordance with an embodiment, an active user shares their information display to another user. An active user can become a passive user if they discontinue sharing their information display, and a passive user can become an active user by sharing their information display. For example, a passive user can have a remote desktop application running to collaborate with an active user's computer. The passive user can become an active user when the passive user shares their information display to other users.

As shown in FIG. 7, two users are in a two-way collaborative remote desktop setup. As described above, although in this example a first computer having a first application is described, where the first application is accessed by a second user, in accordance with other embodiments, the system can reside on a single shared computing device. For example, the shared computing device can have a first application instance, where user activity made by a different user at the shared computing device instantiates a second application on the shared computing device having a state substantially identical to that of the first application. As further shown in FIG. 7, user 701 (e.g., first user) is running an application 708 (e.g., a local application) which the user interacts with, and a remote desktop client application 750 showing a second user's 702 interactions with an application 709 (e.g., a local application). The second user is running the application which the user interacts with, and a remote desktop client application 751 showing the first user's interactions with their local application.

In accordance with an embodiment, changes made by the second user on their local application are executed locally on their computer. The result of the changes is visible on information display 711, in addition to a remote desktop window on the first user's information display 710. For example, computer 707 includes the local application and the remote desktop client application. The remote desktop client application includes an input handler 726 and an output handler 730. Input 781 from the second user is received at an OS input handler 713, which communicates the input to the local application. The local application processes the input and produces a visual output to be displayed on the information display. For example, an OS output handler 715 receives the visual output from the application and decides how much of the entire window will be displayed, where on the information display the window will be located, and communicates the visual output 783 to the information display. The OS output handler also communicates the visual output to an OS remote output handler 770. The OS remote output handler communicates the visual output to an output handler 720 at the remote desktop client application at the first user's computer, which communicates the visual output to an OS output handler 714 for display at an information display 710.

In accordance with an embodiment, any changes made by the first user at their local application are executed only at the local application. The result is visible on the information display, in addition to the remote desktop window on the second users information display. For example, computer 706 includes the local application and the remote desktop client application. The remote desktop client application includes an input handler 716 and the output handler. An interaction input/request 780 is received at an OS input handler 712. The input handler communicates the input to the local application, which processes the input and produces a visual output to be displayed on the information display. The OS output handler receives the visual output from the application and decides how much of the entire window will be displayed, where on the information display the window will be located, and communicates the visual output 782 to the information display. The OS output handler also communicates the visual output to an OS remote output handler 740, which in turn communicates the visual output to the output handler at the second user's remote desktop client application. The output handler communicates the visual output to the OS output handler for display at the information display for the second user 711.

In accordance with an embodiment, in those instances when the first user decides to interact with the second user's local application through the remote desktop client application, then an instance of the second user's local application will be instantiated on the first user's computer. The second user's information display will show two applications running; the first user's local application and the instance of the second user's location application. For example, an input to interact with the second user's local application is received at an OS input handler 712, and is communicated to an input handler 716 at the remote desktop client application. The input is communicated from the input handler to an OS remote input handler 766, which communicates with the local application at the second user's computer to receive current state information for the local application. The OS remote input handler communicates the current state information to an application launcher 703, and the application launcher uses the current state information to instantiate an instance of the second user's local application on the first user's computer having substantially the same application state. In accordance with an embodiment, after an instance of the second user's local application has been instantiating on the first user's computer, subsequent interactions between the first user and the second user's local application can update the state of the instance of the second user's local application on the first user's computer using the current state information of the second user's local application. Similarly, in accordance with an embodiment, after an instance of the second user's local application has been instantiating on the first user's computer, subsequent interactions between the second user and that instance of the second user's local application on the first user's computer can update the state of the second user's local application using the current state information of that instance of the second user's local application on the first user's computer.

In accordance with an embodiment, in those instances when the second user decides to interact with the remote desktop application to interact with the first user's local application, then an instance of the first user's local application will be instantiated on the second user's computer. The first user's application display will show two applications running; the second user's local application and the instance of the first user's location application. For example, an input to interact with the first user's local application 708 is received at the input handler 726 at the second user's remote desktop client application from the OS input handler, and communicated from the input handler to an OS remote input handler 736. The OS remote input handler communicates with the local application 708 at the first computer to receive current state information associated with the local application, and communicates the current state information to an application launcher 704. The application launcher uses the current state information to instantiate an instance of the first user's local application having substantially the same application state. In accordance with an embodiment, after an instance of the first user's local application has been instantiating on the second user's computer, subsequent interactions between the second user and the first user's local application can update the state of the instance of the first user's local application on the second user's computer using the current state information of the first user's local application. Similarly, in accordance with an embodiment, after an instance of the first user's local application has been instantiating on the second user's computer, subsequent interactions between the first user and that instance of the first user's local application on the second user's computer can update the state of the first user's local application using the current state information of that instance of the first user's local application on the second user's computer.

Figure 8:
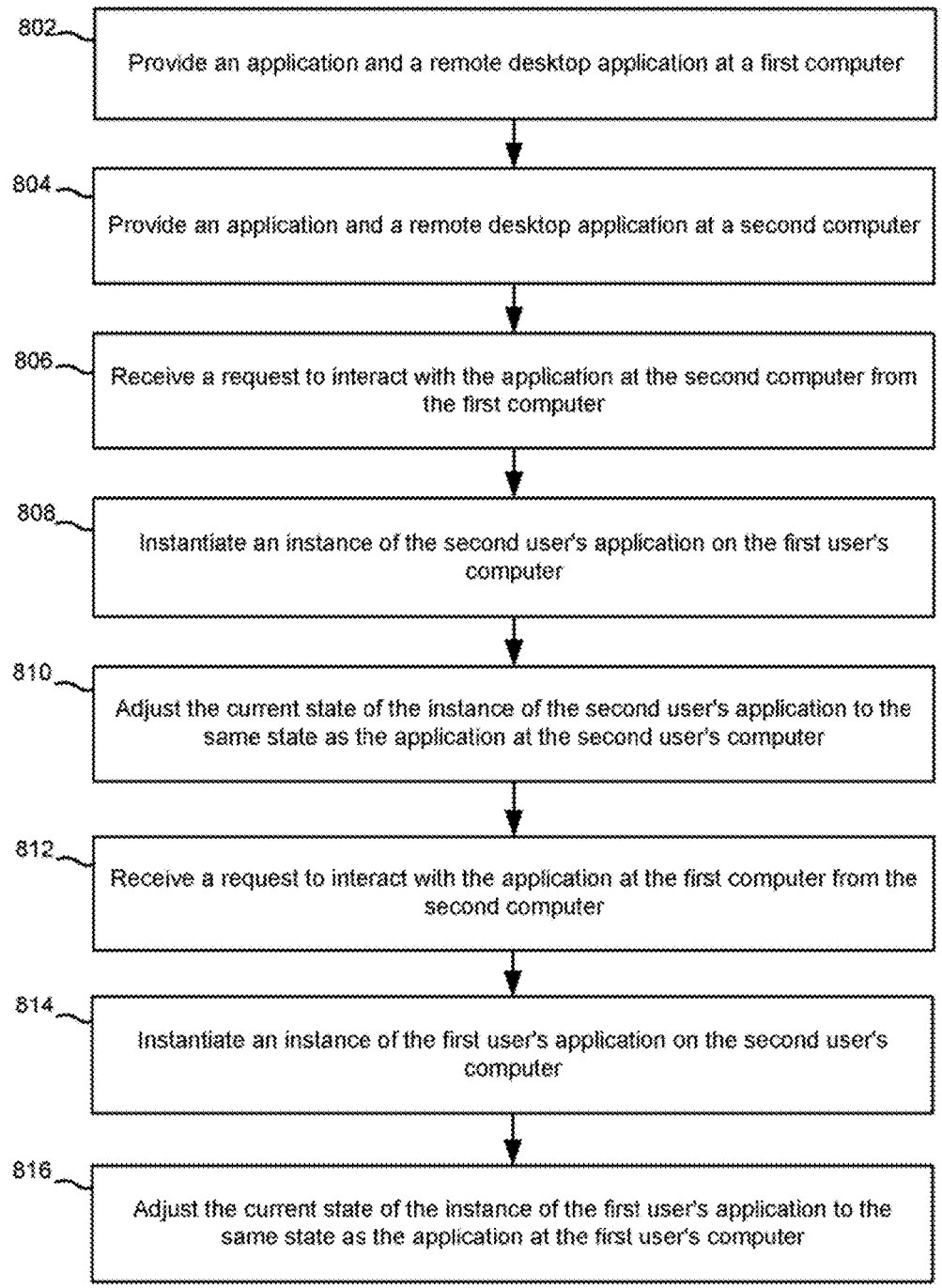
FIG. 8 shows a flow chart of a method in accordance with an embodiment, for providing a two-way collaboration system.

FIG. 8 shows a flow chart of a method in accordance with an embodiment, for providing two-way collaboration in a collaborative desktop system. Although in this example a first user and a second user are described, any plurality of users can collaborate. Additionally, although the users will be referred to as a first user and a second user, either user can be an active user or a passive user. At step 802, an application (e.g., a local application) and a remote desktop client application are provided at a first computer. The local application can be, e.g., a web browser or another application. The remote desktop client application is used by the first user to interact with an application on a second computer. At step 804, an application (e.g., a local application) and a remote desktop client application are provided to a second user. At step 806, the first user interacts with the local application at the second user's computer. The first user interacts with the second user's local application using the first user's remote desktop application. At step 808, an application instance of the second user's application is instantiated on the first user's computer after the first user interacts with the second user's local application. At step 810, the current state of the application instance of the second user's application is adjusted to the same state as second user's local application. At step 812, the second user interacts with the first user's local application using the second user's remote desktop client application. At step 814, an application instance of the first user's application is instantiated on the second user's computer after the second user interacts with the first user's local application. At step 816, the current state of the application instance of the first user's application is adjusted on the second user's computer to the same state as first user's local application.

In accordance with various other embodiments, the remote desktop client application used by the second user can display the name and/or icon of the application(s) running on the first user's computer. When the second user requests to activate one of these applications by selecting the application name or icon of the available applications, the local start and activation sequence taken on the second user's computer to instantiate a local instance of the first user's application will only launch, activate, and bring the application to the same state locally on the second user's computer. Since there are no local actions made by the second user through the remote desktop system, no actions are taken on the new local application. In accordance with various other embodiments, the remote desktop client application used by the second user can display an indication of the first user, such as a name indicator, color indicator or icon indicator representing the first user. When the second user requests to activate an application on the first user's device, the currently active application on the first user's device is instantiated to the same state locally on the second user's device. For example, devices with smaller screens, such as mobile phones or other portable mobile devices, where there is not enough screen size to show the entire window of an application, but there is enough space on the display to show a list of available applications, or an indication of the user hosting the application, can be used to select an application running on a first computer or be used to select a user hosting the application. This provides for the ability to transfer applications with state between both mobile and mobile devices or mobile and standard devices.

The above examples illustrate how two or more users can collaborate using a collaborative desktop system. Users of a shared application can interact with the application without impacting the other users. For example, the interaction made by a remote user will result in a local application being opened on the remote user's computer. The application is opened in the same state as the shared application, and any interaction on the local application is executed locally on the remote user's computer. Since all information displays are shared between all users, the other users will still see the remote desktop window showing the shared application, where the shared application and state is unchanged. The other users will also see a new remote desktop window from the new remote active user. The new remote desktop window will display the same application as on the shared application, but in a different state.

In accordance with an embodiment, systems such as those described herein can significantly impact the sales and advertisement of applications. For example, presenting an application to a user that has a need for the application is a key issue when dealing with application sales. Industry experience places significant weight on reviews by other users as an important factor in deciding whether to purchase an application, and even more valuable is the word-of-mouth from trusted users such as friends and family. However, a user may not be aware of what applications a friend or family member is using, so it is left to chance if the name of application is mentioned in conversation. Oftentimes, even when the name of the application is known, the user still needs to figure out how and where to locate the application, and how to download the program. This is often accomplished by the user searching on the internet, or they will search in a dedicated application store (for example Amazon or Apple's AppStore etc.). Nonetheless, there are several layers of friction to discovery and distribution of applications based on the most valuable lead: family and friends.

Systems such as those described herein can also aid in application discovery and distribution. For example, if one of the users (e.g., a host user) is using an application that another connected user (e.g., client/remote user) finds interesting, then the connected user can initiate an interaction with the host application through a remote desktop window. Assuming the application is not yet installed on the requesting user's computer, then the host computer can inform the requesting user's computer about where and how to download and install the application. In the event the application is free, the installation can takes place on the requesting user's computer, after which the application will start in same state as on the host computer, but now locally on the requesting user's computer. If the application is a premium application, a purchase prompt can be displayed to purchase the application.

Unlimited Multi-User Desktop

As computer monitors become increasingly larger, it is now feasible to have several people collaborating or working independently from the same monitor, powered by the same computing device. This however is not yet possible with current operating systems such as Microsoft Windows, Apple's OSX, Android and Linux, since all of these operating systems are designed for single person use. That means only one object can be active at a time; adding touch capability to the operating system, or adding additional mouse and keyboard, is not enough to allow multiple users to use the same computing device simultaneously.

In accordance with an embodiment, an unlimited multi-user desktop solves this. With the unlimited desktop all the objects are distributed over an unlimited surface. Instead of icons that can launch the object, the actual object(s) is on the desktop. Due to the unlimited size the user can scroll to the section of the desktop they want to see—particularly the section containing the object they want to use. Since roaming is personal, another user can, via their client-area (on the same computing device or on another computing device), choose to navigate to a different section of the unlimited multi-user desktop and use the objects located there. With an unlimited multi-user desktop, the users are no longer bound by the same computer, since a system designed for free roaming on the entire desktop can be navigated from any other computer device running compatible software.

Figure 9:
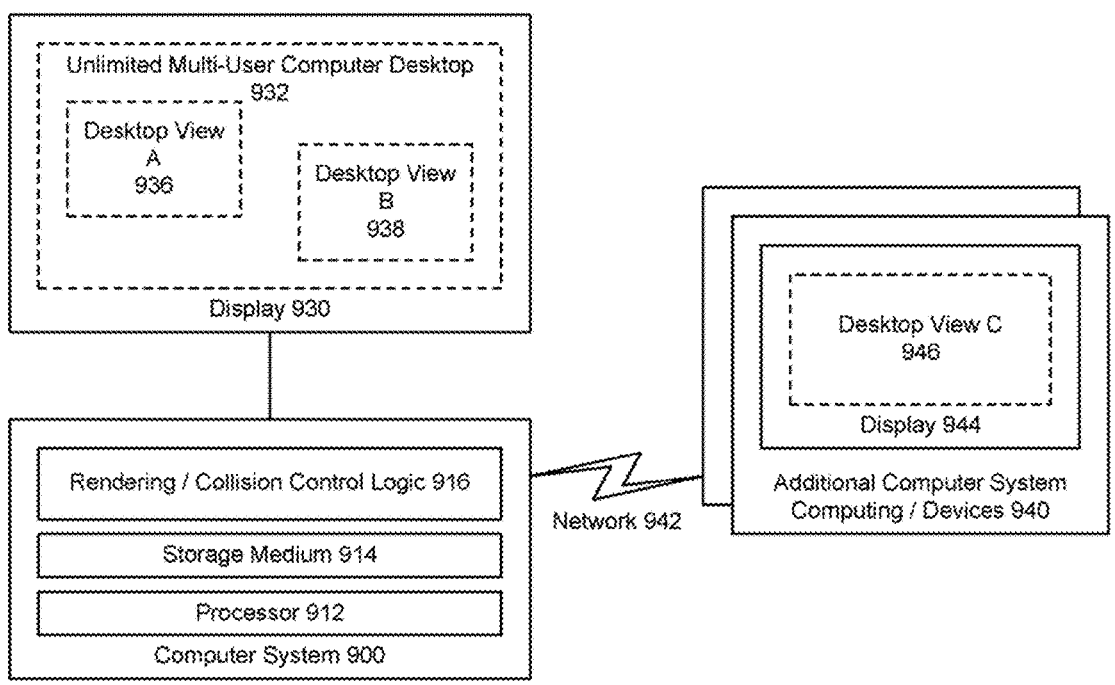
FIG. 9 shows a system including an unlimited multi-user computer desktop environment, in accordance with an embodiment.

FIG. 9 shows a system including an unlimited multi-user computer desktop environment, in accordance with an embodiment. As shown in FIG. 9, in accordance with an embodiment, the system can include a computer system or device (900), including a processor (912), storage medium (914), and rendering logic/collision control logic (916). A display device (930) such as a computer monitor can be used to display an unlimited multi-user computer desktop (932), including desktop views (936) and (938). In accordance with an embodiment, additional or other computers/computing devices (940), connected via a network (942), can display (944) other views (946) of the desktop.

In accordance with an embodiment, the system includes a computing device with an appropriate rendering logic that runs the objects with state and functionality, e.g., applications, and stores and maintains the object's position and size and z-layer on the unlimited desktop. The z-layer denotes the object's layered order in the stack of objects. This is used to determine what object is on top, and what sections of the objects below are visible to render. In accordance with an embodiment, additional/other computing devices can be used to support users connecting to the desktop from those other computing devices. The computing device hosting the desktop must keep track of each connected user at any one time. Each user can have a set of properties attached to them, such as the area of the desktop they are currently looking at in terms of, e.g., top-left position, size and zoom level, and the objects that are rendered on the section of the desktop the user can see. In accordance with an embodiment, each object can have a list of properties attached, such as:

(1) Which user, if any, is controlling the object's position/size/layer. This is referred to as the "controlling user of an object"; there can be only one controlling user for each object.
(2) The list of users who is actively using the object. This is referred to as "active users of an object".

In accordance with an embodiment, the system can use a variety of techniques to determine if a user is actively using a particular object. One technique is to mark the user as active on an object once the user has interacted with the object and then remove the activation after a given time. Another technique is to mark the user as active for any particular object that is in view of the user and to remove the active status once the window is no longer in view.

In accordance with an embodiment, the computing device hosting the desktop can use the following information to determine the section of the desktop that is in view to each user:

(1) The size of the users monitor(s) or section of monitor (s) used to render a section of the desktop.
(2) The position on the desktop.
(3) The zoom level.

In accordance with an embodiment, the computing device with the desktop will limit communication of activity and updates of objects to those users that have the impacted section of the desktop in view.

In accordance with an embodiment, a notification feature can be implemented for active users of an object. The purpose of such feature is to inform all or selected users of which objects are actively used by which users. That information is useful in the event a plurality of users want to engage in a shared activity around the same object. One example of an embodiment can be, but is not limited to, that each user is assigned a user-specific and unique color. This color can be rendered along the border of the users' application rendering the section of the desktop in view, such that each user knows what their assigned color is. An area of each object can be used to render the color of the active users. If several users are actively using the object at the same time, then all the users' colors will be rendered in this area of the object. One example of this rendering is to use the border of the object to render the color or stripes of colors, in case multiple users are active. Another example is a list of the active users' names is placed in a predefined section of the object.

In accordance with an embodiment, a notification feature can be implemented for the controlling user of an object. The purpose of such a system is to handle conflict when a second user wants to take control of an object that is currently in control by a first user, or is actively used by one or multiple other users. When a second user is granted the right to control an object, the movement/resize/layering made by the second user is reflected on all connected users with this object in view.

In accordance with an embodiment, the system will chose between different levels of restrictions to balance between the conveniences of being able to move freely with the intrusion of interrupting other users. In this case, the impacted users of a second user taking control will be a first user that currently has control and/or any other users actively using the object.

In accordance with an embodiment, the system can choose to implement restrictions at various levels. The lowest possible restriction would be to simply grant access to the second user right away. A higher restriction level could be to inform the second user that other users are in control, and then ask the second user to confirm or cancel the control before the system grants the control. An even higher restricted level could be to prevent a second user from getting control until all active users and/or any controlling user (if such exist) accept to release the control based on a notification that the second user want to gain control. The level of restriction could preferably be configurable by the desktop owner.

Some objects will only be able to render the same content in all users' views of the same object. Other objects, such as, e.g., a web browser or a PDF file, or a document or presentation or spreadsheet, could offer the users the ability to scroll different sections of the object independently of each other. This would have the added benefit of e.g., allowing two or more users to simultaneously read from the same source but allow one of the users to scroll down faster than the other user.

Some interactions with an object will result in a state change that affects all active users of the object. One example is when multiple users are active on the same instance of a website, and a second user is clicking a link that navigates to a different page. This navigation will impact all active users of that instance of the website. To avoid disrupting the other users in their ongoing activity with the object, a notification feature can be used. In accordance with an embodiment, such a notification feature can operate on several configurable levels of restriction. The lowest restrictive level could be when a user initiated object state change is executed right away. A more restrictive approach could be when the second user requesting the change is notified that this will impact other users who are currently active (a notification will only happen if other users is actively using the window). The most restrictive system could be when the other active users will be prompted and requested to allow the state change before the second user is able to complete the requested change.

In addition to the previously-described notification feature, in accordance with an embodiment, the system can include additional features that allow a second user requesting to initiate a state change on an object that is actively used by other users, to create a new object instance starting from substantially the same state and then execute the requested state change onto that new object. This method will allow the second user to perform any change on an object without interrupting other users.

In accordance with an embodiment, the system can include features for determining an application state, or instantiating a new application instance with a substantially same state, as described in U.S. patent application titled "SYSTEM AND METHOD FOR ENABLING A COLLABORATIVE DESKTOP ENVIRONMENT", application Ser. No. 13/213,025, filed Aug. 18, 2011, and published as U.S. Publication No. 20120054640; which application is herein incorporated by reference.

In accordance with an embodiment, these methods can be combined, where a second user's request to change an object state actively used by a first user can result in a notification to the second user asking if the second user would like to perform the state change in the same object and thereby impact all active users or if the user would like to perform the state change into a new object. This method of handling interaction with an object by multiple users is very relevant for, but not limited to e.g., web applications, as it allows a simultaneous consumption of a website on different sections of the shared web page and in addition allow both users to navigate to the same new content page or any one of the users to branch off and create a new shared instance of the application. The newly created object will be created on the unlimited multi-user desktop and therefore accessible and visible to all connected users.

In accordance with an embodiment, the system can implement a physics engine which simulates friction, so that when a user releases control of movement, then the movement will continue in the direction and speed of the controlled movement and with a deceleration equivalent to the chosen friction. With such a physics system, border control is important to implement as without it, the user can inadvertently put an object in motion in a way that make it increase the size of the desktop far further than what the user intended.

One suitable solution to this problem can be to restrict movement of an object to stay within the boundaries of the currently visible area of the desktop at the current zoom level. This will prevent objects from getting lost due to a fast movement made by the user. In order to make the system even more useful, the borders will be set to a certain distance inside the viewable area. That way an object pushed to the side will not end up along the edge of the viewable area but rather at the predefined distance from the edge of the viewable area and with that allow the user to move the object without repositioning the desktop.

In accordance with an embodiment that uses a physics engine, the system can implement a stretched movement when an object is moved outside the border either controlled by a user or animated by the physics engine. The stretched movement will give the user the experience of a rubber-band surrounding the border. This means that a controlled movement outside the border will only partially follow the users input with less impact on the rendered position the further into the border zone that the overshoot is.

Similarly if the object is violating the border due to a simulated movement by the physics engine, then the distance rendered by the object is reduced the further into the border zone that the movement takes the object. Once the movement has ended, i.e., if the user release control and speed animation has ended or when a previously released control has ended its speed animation into the border zone, then the object will be animated back into the position where the border is no longer violated. This border animation should be made so that it looks like the window is pulled gently back to where the border no longer is violated.

In accordance with an embodiment, a suitable formula for the move-animation, (i.e., the animation of the position following a user releasing direct control of the window) can be a standard formula for an initial speed & fixed friction system, for example:

A=deceleration [m/s2]
V=initial speed [m/s]
T=duration of animation, calculated as V/A
D=distance covered while bringing the object to a halt given the initial speed and the fixed friction, calculated as V*T/2

During the animation, the time "t" is going from zero to T. In accordance with an embodiment, during this time the relative position to the last recorded position while in user control can be calculated as:

$$D*(t/T+(T*t-t*t)/(T*T))$$

In accordance with an embodiment, a suitable formula for the rendered position relative to the border position as a function of the requested border violation delta will need to return a lower number than what was requested. The simplest formula can be to take the distance requested and multiply that with a fixed factor less than 1. An advantage of this formula is that there is no limit to how far the user can stretch into the border zone; the downside is that the rendered output drops significantly as soon as the border zone is violated and thereby not giving the best possible simulation of a rubber-band covered border.

In accordance with an embodiment, a more realistic formula can be to follow an exponential curve with definitions of how much the rubber-band must be able to stretch and how far the requested border violation will be when the maximum stretch is reached. Once maximum stretch is reached the rendered output will stop at that level. Due to the use of exponential functions this formula, while being more demanding to calculate, offers a realistic representation of the physical world. The parameters involved can be, for example:

A=max rendered output position relative to the border position, this is an input.
B=requested border violation position, relative to the border position, this is an input.

With D being the current requested border violation position relative to the border limit then, in accordance with an embodiment, the rendered output position relative to the border position can be calculated as:

$$MIN(B,D)*A/B*EXP(1-ABS(MIN(B,D))/B)$$

In accordance with an embodiment, a suitable formula for animating an object that is violating the border back into a non-violated position can be to let the object follow an exponential function, wherein the parameters can be, for example:

D=requested border violation distance relative to border position, this is input.
T=total duration of animation, this is input.
C=speed factor, must be less than 1 and positive, this is input.

With "t" being the current time, starting from 0, going to T, then, in accordance with an embodiment, the rendered border violation relative to the border position can follow the formula:

$$D*EXP(-t/(C*T))$$

The above formulas are provided by way of example, to illustrate various embodiments. In accordance with other embodiments, other formulas can be used.

Figure 10:
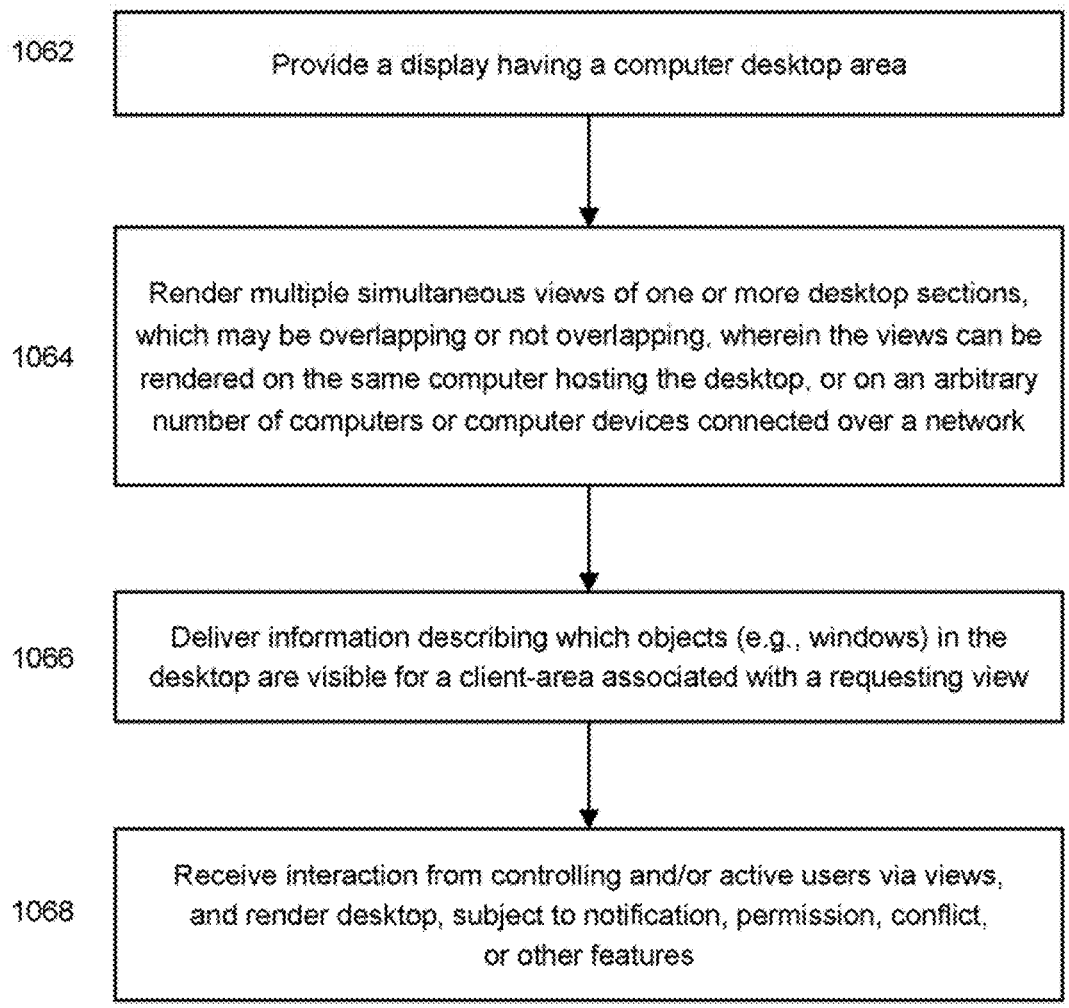
FIG. 10 is a flowchart of a method for providing an unlimited multi-user computer desktop environment, in accordance with an embodiment.

FIG. 10 is a flowchart of a method for providing an unlimited multi-user computer desktop environment, in accordance with an embodiment.

As shown in FIG. 10, in accordance with an embodiment, at step (1062), a display having a computer desktop area is provided.

At step (1064), the system renders multiple simultaneous views of one or more desktop sections, which may be overlapping or not overlapping, wherein the views can be rendered on the same computer hosting the desktop, or on an arbitrary number of other computers or computer devices connected over a network.

At step (1066), the system delivers information describing which objects (e.g., application windows) in the desktop are visible for the client-area associated with a requesting view.

At step (1068), the system receives interaction from controlling and/or active users via views, and renders the desktop, subject to any notification, permission, conflict, or other features.

Example

Figure 11:
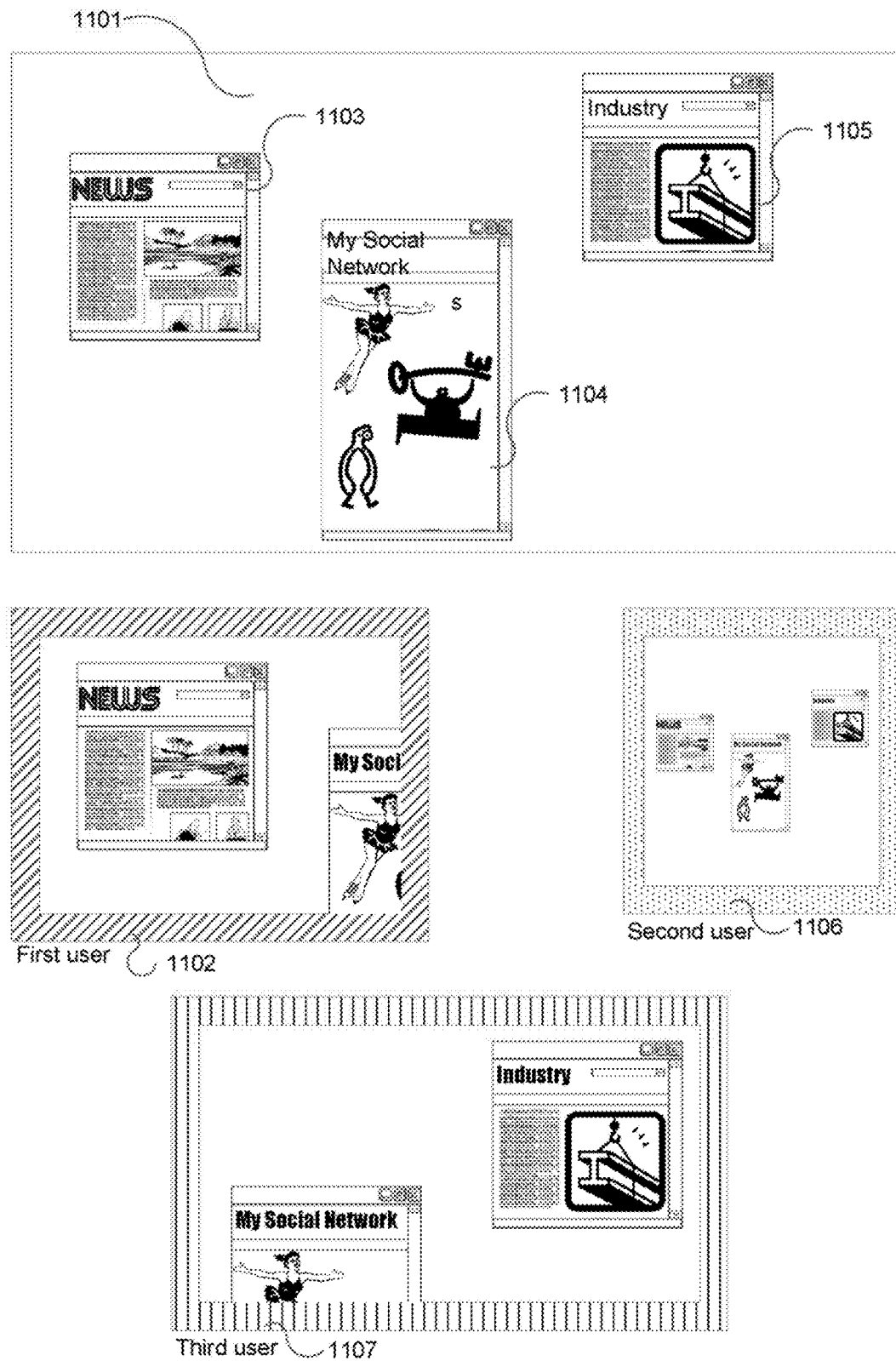
FIG. 11 shows an example of an unlimited multi-user desktop, with three users connected, in accordance with an embodiment.

FIG. 11 shows an example of an unlimited multi-user desktop, with three users connected, in accordance with an embodiment. The example shown in FIG. 3 illustrates how each user can independently choose which section of the desktop to look at, and at individual zoom levels and through individual dimensions of the users device or section of device allocated for the unlimited multi-user desktop.

In the example shown in FIG. 11, the entire desktop (1101) has three windows (1103, 1104 and 1105). In this example, the first user (1102) is showing the desktop at 100% zoom. The size of the client-area allows the first user to see all of one window (1103) and a part of another window (1104). A second user (1106) has another proportion of the client-area. The second user has chosen to zoom the desktop so that all windows (1103, 1104 and 1105) are visible within the client-area. A third user (1107) has a third proportion of the client-area. The desktop position chosen by the third user allows some of one window (1104), and all of another window (1105), to be visible to the third user. Notice how each of the three users in this example will get a user-specific color rendered along the border of their client-area. This color is used to identify each user, and will in the other figures be used to illustrate who is actively using a window. The color is only one example of identifying more than one user; other methods could include numbers, patterns and/or text.

Figure 12:
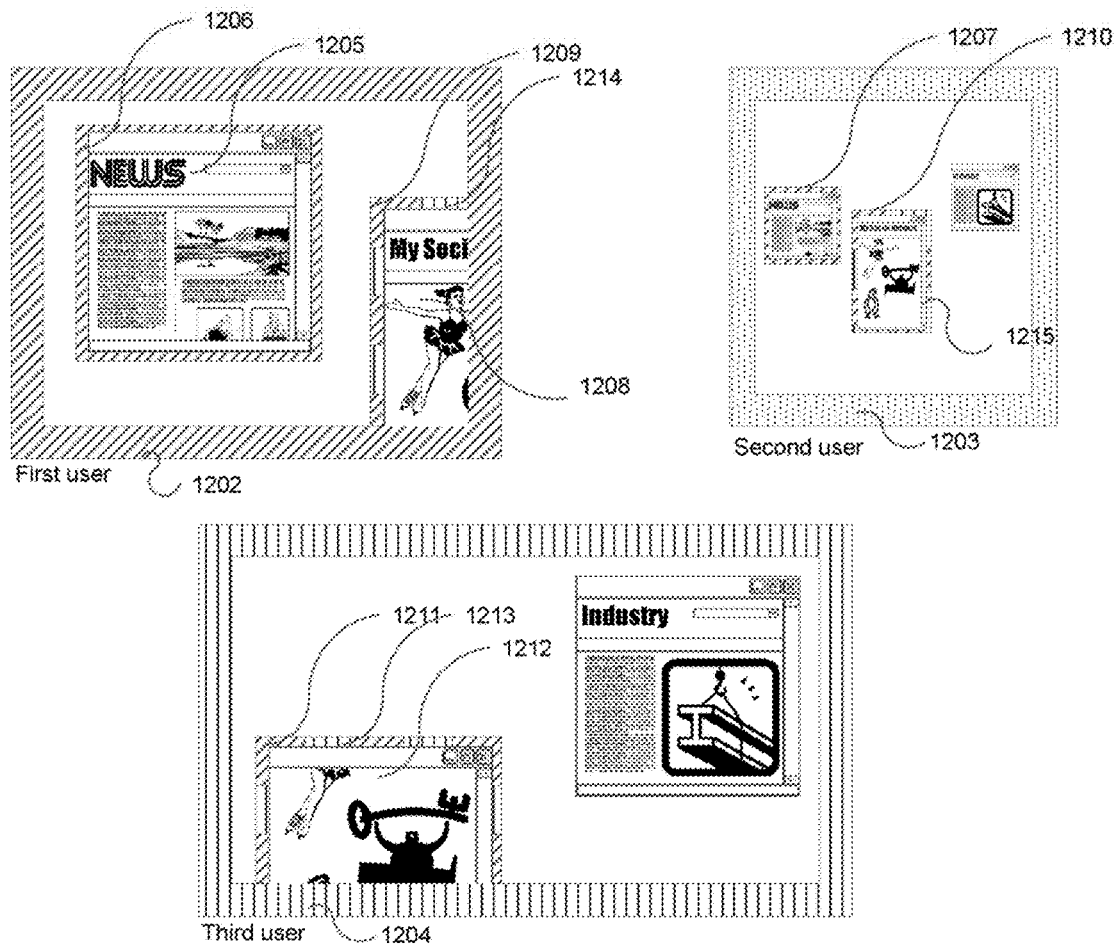
FIG. 12 shows an example of how an objects active state can be rendered on all users views of the desktop, in accordance with an embodiment.

FIG. 12 is a continuation of the desktop introduced in FIG. 11, in accordance with an embodiment. FIG. 12 also illustrates how multiple users actively using the same object can be rendered as a striped border containing each user's color. Finally the illustration shows how some objects allow each user to have an individual content position of the same shared object.

In this example, the first user (1202) starts with activating a window (1205), e.g., by touching the window or scrolling the content in the window. As soon as the window is activated by the first user, the border of the window (1206) will be rendered in the first user's color. All other connected users that have this window in their client-area will see the first user's color for the border of the window (1207). Another example is that the first user (1202) activates a window (1208). As a result, the border is colored with the first user's color on all visible views of the window (1209), (1210) and (1211). Subsequently, the third user (1204) scrolls the content in a window (1212) upwards into a new position. In this example, the window (1212) will allow user-specific content positions. As a result, the window (1212) will be activated for this third user. This is illustrated to all users by a two-colored border (1213) of both the first and third user. This happens on all instances of the window (1208), (1212) and (1215). Notice how the content position of window (1208) and (1215) remains unchanged because the first and second user (1203) has not changed the content position.

Figure 13:
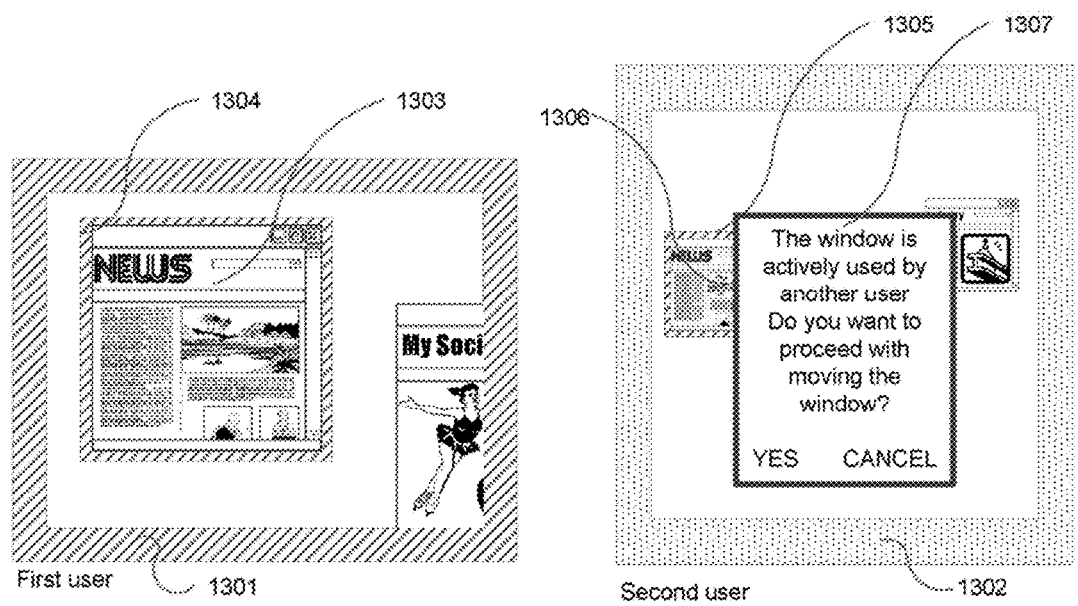
FIG. 13 shows an example of how notification of a user taking control of an active object can be implemented, in accordance with an embodiment.

FIG. 13 is a continuation of the desktop introduced in FIG. 11, in accordance with an embodiment. In this illustration, a first user (1301) activates the window (1303). In response, the multi-user desktop client will render the first user's color on the border (1304) and (1305). Subsequently, the second user (1302) tries to move the window (1306). In this example, the window is actively used by the first user, and the second user will receive a prompt (1307) informing the second user about this fact and asking what action to take. If the second user selects "YES" then control is granted to the second user, and the second user is now allowed to freely move the window. This will impact the first user also, since the window's position and size is shared. If the second user clicks "CANCEL" then the request is cancelled. If the request is cancelled, the window is not activated for the second user, and the first user keeps control of the window because no change is made by the second user.

Figure 14:
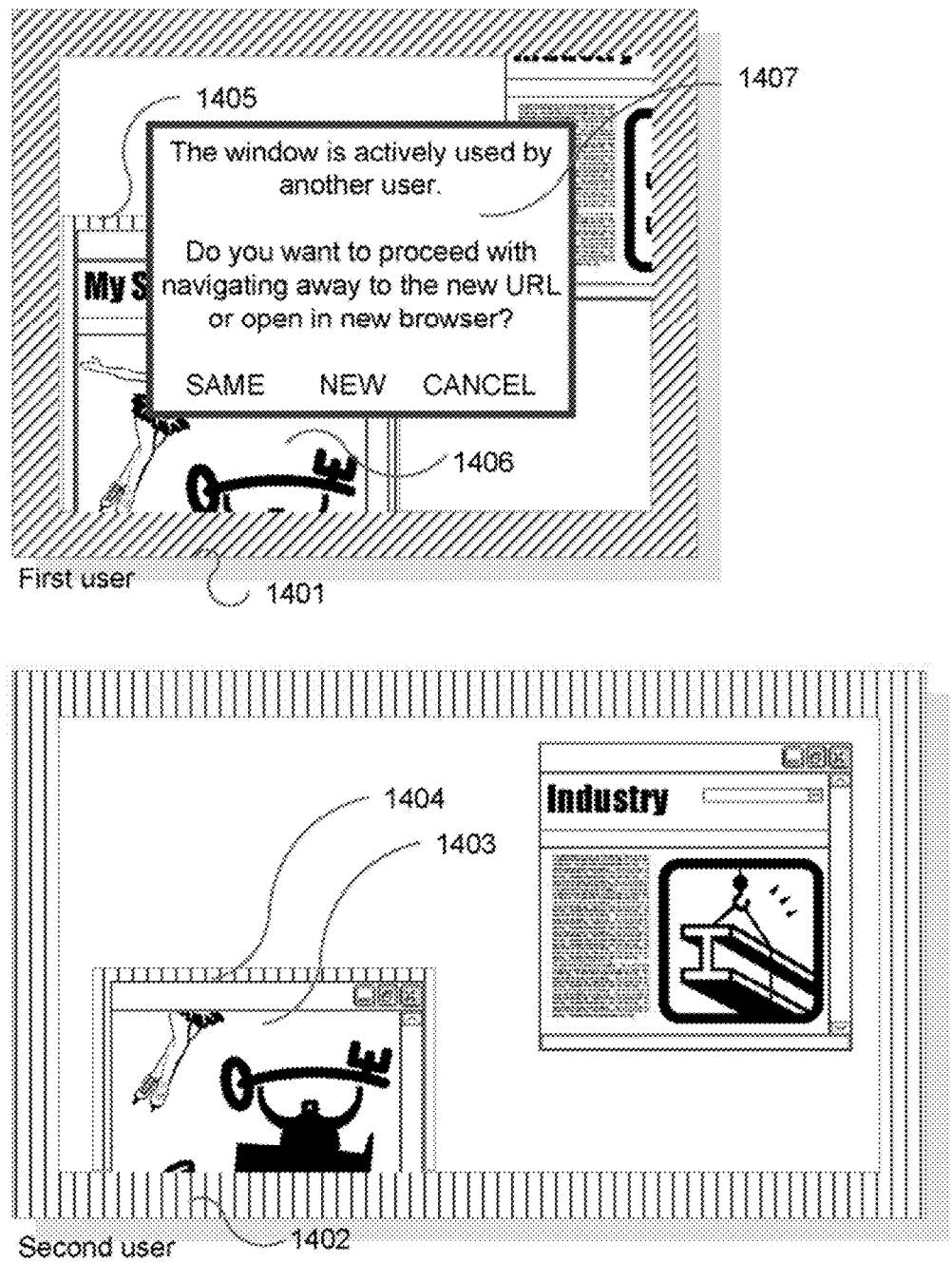
FIG. 14 shows an example of how notification of a first user requesting to change an objects state, through an object that is already actively used by a second user, can be implemented, in accordance with an embodiment.

FIG. 14 is a continuation of the desktop introduced in FIG. 11, in accordance with an embodiment. In this illustration, a second user (1402) has scrolled the content in the window (1403). This means the window is activated and as a result the border (1404) and (1405) is given the second user's color. Subsequently, the first user (1401) tries to change the application state behind the window (1406). In this example it is a webpage where the first user clicks the image (1406) which contains a URL to a different website, i.e., if this URL is loaded the object state will change. Since the window is actively used by the second user it means that a change made by the first user on this window will impact the second user. Because of this, a dialog box (1407) can be shown, informing the first user about the potential impact of the requested action. The three options are discussed in the following figures.

Figure 15:
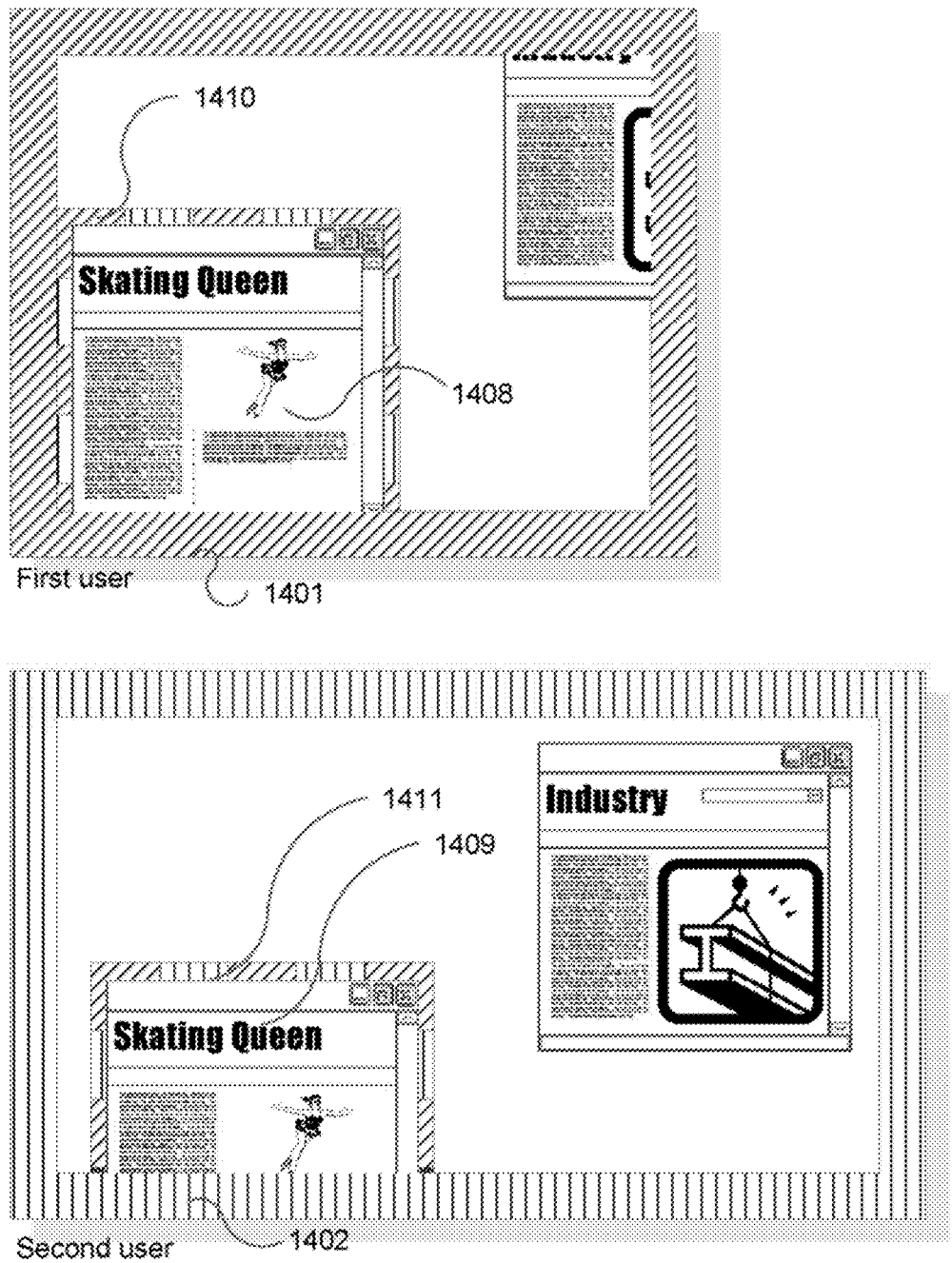
FIG. 15 shows a continuation of the example illustrated in FIG. 14, in accordance with an embodiment.

FIG. 15 is a continuation of the example described in FIG. 14, in accordance with an embodiment. In this illustration, the first user selected "SAME" (one of the three options illustrated in FIG. 14) and thereby the requested object state change is imposed on the shared object and the result is reflected in both users' views of the object. As a result, the URL behind the link is activated and loaded into the application. The result is rendered in the window for all users (1408) and (1409). Now, when the first user has activated the window, both the second and first users' colors are used in the border (1410) and (1411).

Figure 16:
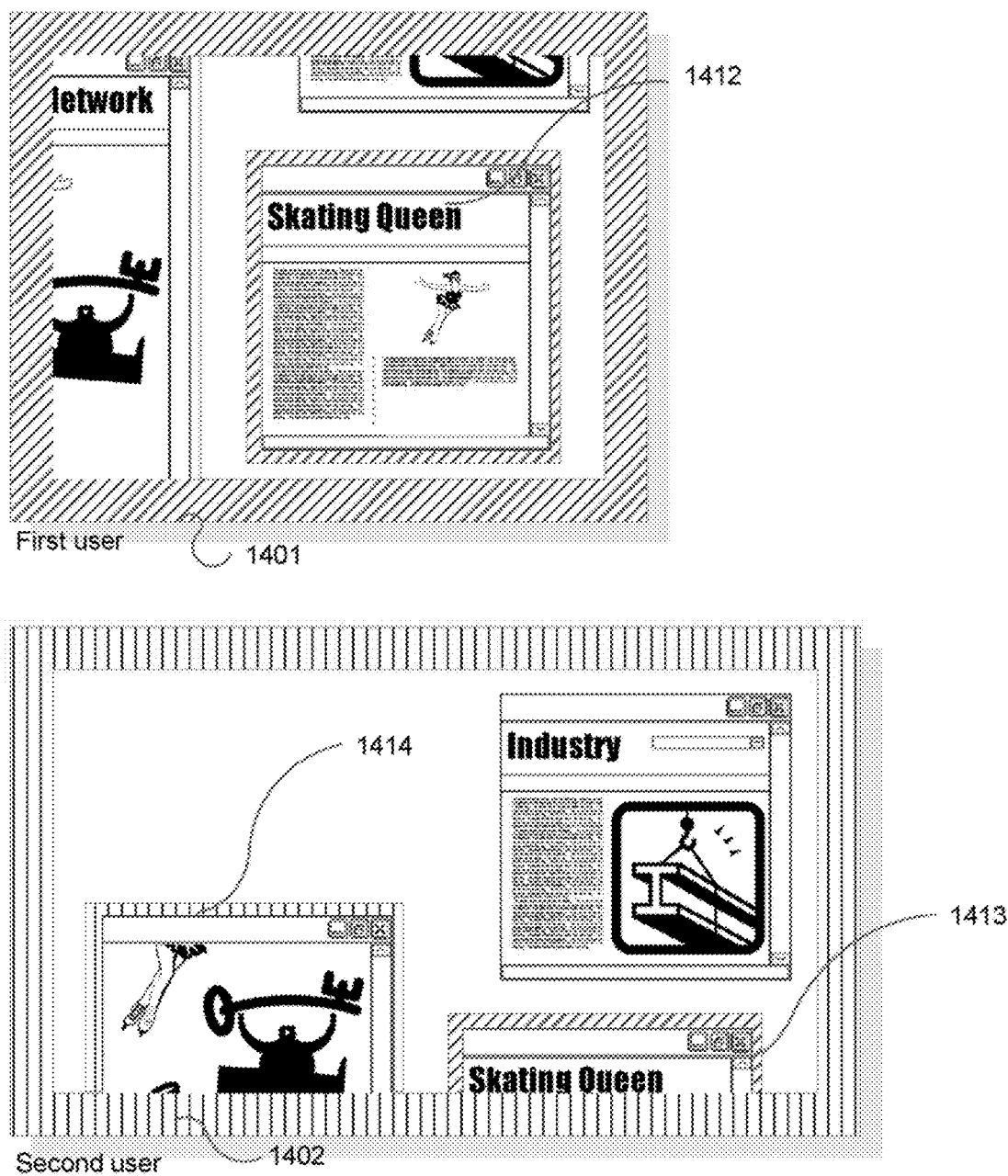
FIG. 16 shows a continuation of the example illustrated in FIG. 14, in accordance with an embodiment.

FIG. 16 is a continuation of the example described in FIG. 14, in accordance with an embodiment. In this illustration, the first user selected "NEW" (one of the three options illustrated in FIG. 14) and thereby the requested object state change is imposed on a newly created object through the original object. This will leave the original object unchanged and the new object moved into view on the first user's client-area. As a result, a new application instance is created with a copy of the state from the original application, and the corresponding window for this application is opened on the unlimited multi-user desktop at a free position. The desktop position for the first user is changed so that the new window is fully visible. The requested action (in this case loading of a URL behind a link) is executed on the new window and the result is rendered for all users that can see the window (1412) and (1413). The border of the window is given the first user's color since this user is considered an active user of this window. The original window (1414) is left as it was, with no change of content and no change of active users.

In accordance with an embodiment, the system can include features for determining an application state, or instantiating a new application instance with a substantially same state, as described in U.S. patent application titled "SYSTEM AND METHOD FOR ENABLING A COLLABORATIVE DESKTOP ENVIRONMENT", application Ser. No. 13/213,025, filed Aug. 18, 2011, and published as U.S. Publication No. 20120054640; which application is herein incorporated by reference.

Figure 17:
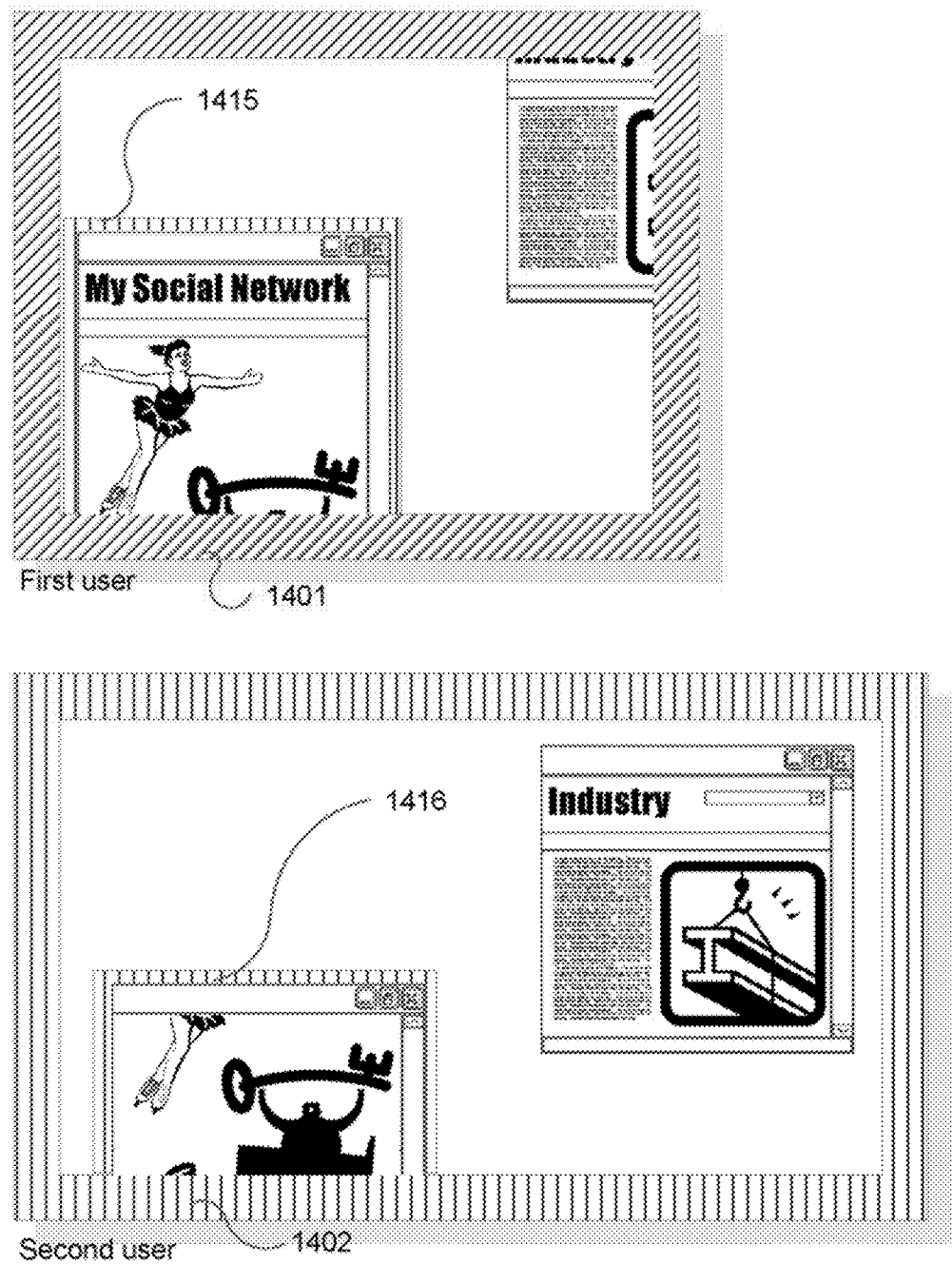
FIG. 17 shows a continuation of the example illustrated in FIG. 14, in accordance with an embodiment.

FIG. 17 is a continuation of the example described in FIG. 14, in accordance with an embodiment. In this illustration the first user selected "CANCEL" (one of the three options illustrated in FIG. 14) and thereby the requested object state change is not imposed, leaving the original object remaining active for the second user only. As a result, the request is cancelled and the active state of the window remains unchanged, i.e., the border (1415) and (1416) remain unchanged as well.

Figure 18:
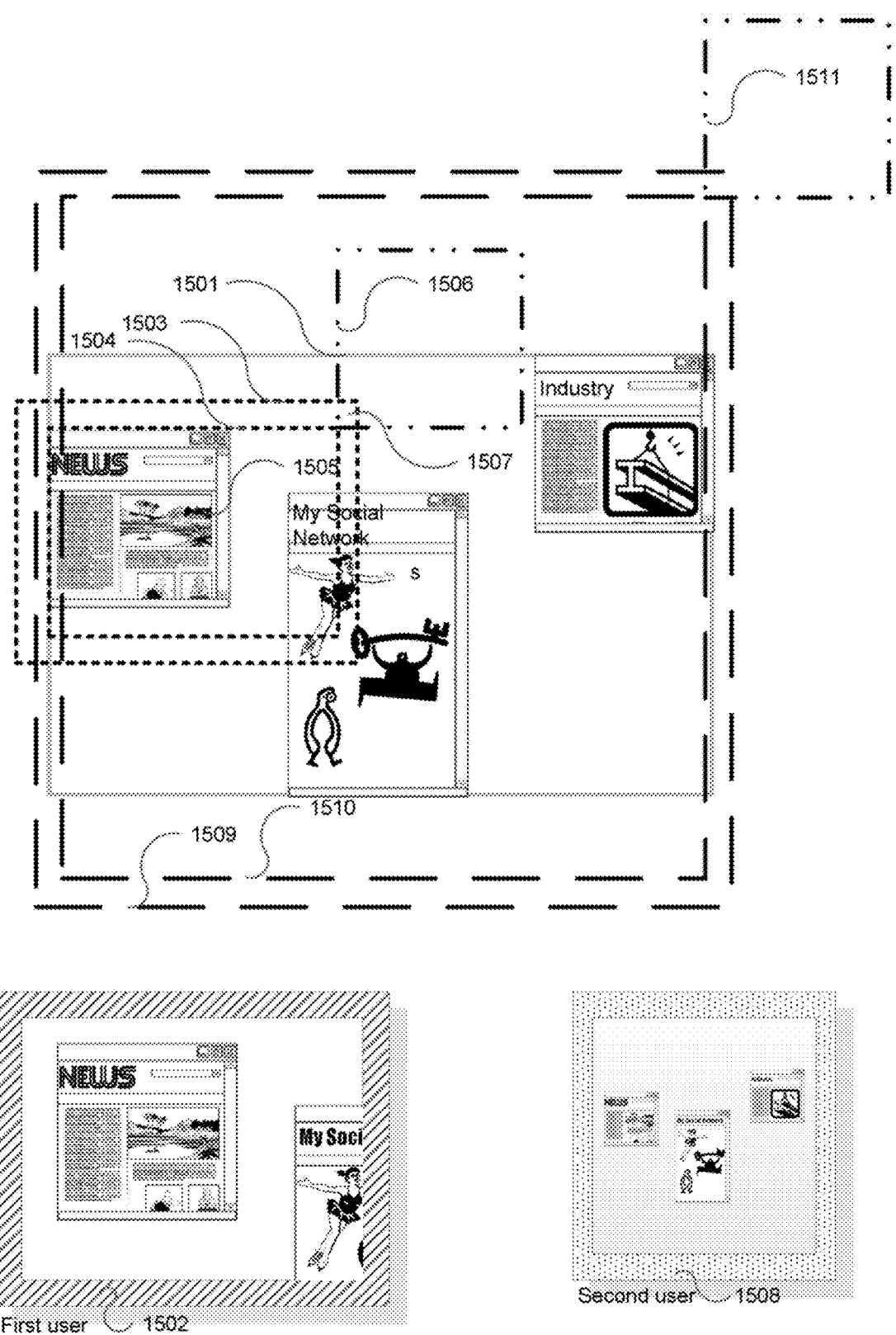
FIG. 18 shows an example of how the desktop can be expanded into an unlimited size, and, where this expansion is user-specific, limited to the section of the client-area of the user making the expansion, in accordance with an embodiment.

FIG. 18 is an example of how the unlimited multi-user desktop can be expanded indefinitely and how the border limit for moving windows is based on the users' client-area, in accordance with an embodiment. The entire desktop (1501) is in this example used by two users. A first user (1502) has the section (1503, indicated with dotted line) as client-area with the border limit (704). If the first user moves window (1505) to the upper-right-most position, then the window will end up covering the area (1506, indicated with long-dash-dot-dot line) on the desktop. The only section of the window (1505) visible to the first user after this move is the lower left corner of the window which is now located at the upper-right corner of the client-area (1507). Similarly, the second user (1508) has the section (1509, indicated with long-dash line) and border limit (1510) on the desktop. If the second user moves the same window (1505) to the second user's upper-right most position, then the window (1505) will end up covering area (1511, indicated with long-dash-dot-dot line).

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

I claim:

1. A system configured to provide a multi-user computer desktop that may be visualized in a manner that spans a plurality of user displays with independent user control over at least two user's views of the desktop or sections thereof, comprising:
   a host computer, including one or more processors, hosting the multi-user desktop for simultaneous use by a plurality of users on which a number of objects such as window may be located;
   at least one display having a computer desktop area through which a user is viewing the desktop or a section of the desktop; and
   a rendering logic that enables multiple simultaneous views of the desktop or a section of the desktop, the views being overlapping or not overlapping, wherein at least one of at least two views is capable of being controlled independently by at least one user,
   further wherein at least three of the following conditions apply:
   (a) the views can be rendered on the host computer, or on an arbitrary number of other computers connected over a computer network,
   (b) information is delivered to the rendering logic describing which object or objects, if any, are visible for an area of the desktop defined by a requesting view requested by each user;
   (c) the system receives interaction from controlling and/or active users via the views, and renders the desktop, subject to any notification, permission, conflict, or other features;
   (d) having a desktop view that is capable of being independent of at least one visual displays size for at least one users of the system;
   (e) having a capability to address conflicts that may occur when multiple simultaneous user interactions occur for the same object; and
   the system having an object moving capability that results in desktop expansion.

2. The system of claim 1, wherein a window can be created on a first computer and moved to a second computer through the multi-user desktop, wherein such a move can be performed by a user moving it over a distance, or by a user changing which section of the desktop is in view, and in that manner rendering windows on a local computer that originates on another computer.

3. The system of claim 1, wherein when moving a window with touch or mouse gestures, a physics animation can be used to simulate continuous movement with friction after the user's move input has ended, and/or wherein a boundary on the unlimited sized desktop is defined by the perimeter of the view and is used to prevent the animated movement moving the window outside of the user's view, unless the window is being moved in one or more particular directions that have special actions tied to them.

4. The system of claim 3, wherein when a window is forced outside a boundary with a controlled move or animated move, then a stretched rendering allows a minor movement outside to be rendered and then animated back to stay within the boundary.

5. The system of claim 1,
wherein the multi-user desktop can be spanning more than one computer, and
wherein a per-window basis user collision control logic enables a view rendering a window to take control of the window's position, size and z-layer, while allowing other views rendering the same window to be notified of a new user taking control of the position/size/z-layer, and, if chosen presents information messages to either a previous user in control, or all users viewing, or delays granting the control to the new user until an existing user has released their control.

6. The system of claim 1,
wherein the multi-user desktop can be spanning more than one computer, and
wherein the system performs per-window basis tracking of which views are currently rendering any section of a window, allowing other views to know who else is watching the same window, and with that enable a computer running an application to know which other computers are in need of rendering data to be delivered by this host computer.

7. The system of claim 1,
wherein the multi-user desktop can be spanning more than one computer, and
wherein the system performs per-window basis tracking of which views are currently actively using a window, allowing other views to know who else is actively using the same window, which information is used as input to a collision control logic, where input made into a window from one view triggers a state change in the application and thereby a rendering change, impacting other watching and active views, and enables the state changing view to be requested if a new application instance should be created, or if the state change should be made in the current application, and with that impact other active or watching users.

8. The system of claim 1, wherein the multi-user desktop is unconfined to any display that may be attached to the computer.

9. The system of claim 1, having an individual desktop view zooming capability.

10. A method of enabling a multi-user computer desktop that may be visualized in a manner that spans a plurality of user displays with independent user control over at least two user's views of the desktop, comprising:

providing a host computer, including one or more processors, that hosts the multi-user desktop for simultaneous use by a plurality of users on which a number of objects such as windows may be located;
providing at least one display having a computer desktop area through which a user is viewing the desktop or a section of the desktop; and
providing a rendering logic that enables multiple simultaneous views of the desktop or a section of the desktop, the views being overlapping or not overlapping, at least two views capable of being controlled independently by at least two users,
wherein at least one of at least two views is capable of being controlled independently by at least one user,
further wherein at least three of the following conditions apply:
(a) the views can be rendered on the host computer, or on an arbitrary number of other computers connected over a computer network,
(b) information is delivered to the rendering logic describing which object or objects, if any, are visible for an area of the desktop defined by a requesting view requested by each user;
(c) the multi-user desktop receives interaction from controlling and/or active users via the views, and renders the desktop, subject to any notification, permission, conflict, or other features;
(d) having a desktop view that is capable of being independent of at least one visual displays size for at least one users of the system;
(e) having a capability to address conflicts that may occur when multiple simultaneous user interactions occur for the same object, and
the multi-user desktop having an object moving capability that results in desktop expansion.

11. The method of claim 10, wherein a window can be created on a first computer and moved to a second computer through the multi-user desktop, wherein a such move can be performed by a user moving it over a distance, or by a user changing which section of the desktop is in view, and in that manner rendering windows on a local computer that originates on another computer.

12. The method of claim 10, wherein when moving a window with touch or mouse gestures, a physics animation can be used to simulate continuous movement with friction after the user's move input has ended, and/or wherein a boundary of the unlimited sized desktop is defined by the perimeter of the view and is used to prevent the animated movement moving the window outside of the user's view, unless the window is being moved in one or more particular directions that have special actions tied to them.

13. The method of claim 12, wherein when a window is forced outside a boundary with a controlled move or animated move, then a stretched rendering allows a minor movement outside to be rendered and then animated back to stay within the boundary.

14. The method of claim 10,
wherein the multi-user desktop can be spanning more than one computer, and
wherein a per-window basis user collision control logic enables a view rendering a window to take control of the window's position, size and z-layer, while allowing other views rendering the same window to be notified of a new user taking control of the position/size/z-layer, and, if chosen presents information messages to either a previous user in control, or all users viewing, or delays granting the control to the new user until an existing user has released their control.

15. The method of claim 10, wherein the multi-user desktop can be spanning more than one computer, and wherein the system performs per-window basis tracking of which views are currently rendering any section of a window, allowing other views to know who else is watching the same window, and with that enable a computer running an application to know which other computers are in need of rendering data to be delivered by this host computer.

16. The method of claim 10, wherein the multi-user desktop can be spanning more than one computer, and wherein the system performs per-window basis tracking of which views are currently actively using a window, allowing other views to know who else is actively using the same window, which information is used as input to a collision control logic, where input made into a window from one view triggers a state change in the application and thereby a rendering change, impacting other watching and active views, and enables the state changing view to be requested if a new application instance should be created, or if the state change should be made in the current application, and with that impact other active or watching users.

17. The method of claim 10, wherein the multi-user desktop is unconfined to any display that may be attached to the computer.

18. A non-transitory computer readable medium, including instructions stored thereon which when read and executed by one or more computers cause the one or more computers to perform the steps for enabling a multi-user desktop, that may be visualized in a manner that spans a plurality of user displays, with independent user control over at least two user's views of the desktop, so that a user may view the desktop or a section thereof through a desktop area of at least one display, comprising:
providing a rendering logic that enables multiple simultaneous views of the desktop or a section of the desktop for simultaneous use by a plurality of users on which a number of objects such as windows may be located, the desktop being hosted by a host computer, the views being overlapping or not overlapping, at least two views capable of being controlled independently by at least two users,
wherein the views can be rendered on the host computer, or on an arbitrary number of other computers connected over a computer network;
wherein information is delivered to the rendering logic describing which object or objects, if any, are visible for an area of the desktop defined by a requesting view requested by each user,
wherein the multi-user desktop receives interaction from controlling and/or active users via the views, and renders the desktop, subject to any notification, permission, conflict, or other features, and
the multi-user desktop having an object moving capability that results in desktop expansion.

19. The medium of claim 18, wherein the multi-user desktop is unconfined to any display that may be attached to the computer.

* * * * *